United States Patent [19]

Tani et al.

[11] Patent Number: 4,565,067
[45] Date of Patent: Jan. 21, 1986

[54] BRAKE SYSTEM FOR VEHICLES

[75] Inventors: Masanori Tani; Shin'ichi Eto; Takeshi Funakoshi; Susumu Nishikawa; Kiyoteru Hashikura, all of Aichi, Japan

[73] Assignee: Mitsubishi Jidosha Kogyo Kabushiki Kaisha, Aichi, Japan

[21] Appl. No.: 536,270

[22] Filed: Sep. 26, 1983

[30] Foreign Application Priority Data

| Sep. 30, 1982 | [JP] | Japan | 57-147170[U] |
| Dec. 29, 1982 | [JP] | Japan | 57-198485[U] |
| Feb. 18, 1983 | [JP] | Japan | 58-21517[U] |
| Feb. 18, 1983 | [JP] | Japan | 58-21518[U] |
| Apr. 25, 1983 | [JP] | Japan | 58-72714 |
| Apr. 27, 1983 | [JP] | Japan | 58-74817 |
| Jun. 1, 1983 | [JP] | Japan | 58-81768[U] |
| Jun. 1, 1983 | [JP] | Japan | 58-81769[U] |
| Jun. 1, 1983 | [JP] | Japan | 58-81772[U] |
| Jun. 15, 1983 | [JP] | Japan | 58-90394[U] |

[51] Int. Cl.[4] ............ F15B 7/00; F15B 9/10; B60T 8/18; B60T 13/00
[52] U.S. Cl. ............ 60/545; 60/547.1; 60/591; 91/376 R; 303/22 R
[58] Field of Search ...... 60/545, 547.1, 552, 60/553, 555, 591, 548; 91/374, 376 R, 461, 388, 391 R, 49, 52, 460, 165, 416; 251/28; 137/596.18, 627.5

[56] References Cited

U.S. PATENT DOCUMENTS

| 3,199,298 | 8/1965 | Brown | 60/552 |
| 3,257,810 | 6/1966 | Hanni | 60/545 |
| 3,408,118 | 12/1966 | Asano et al. | 303/22 R |
| 3,650,573 | 3/1972 | Inada et al. | 303/22 R X |
| 3,670,771 | 6/1972 | Dewberry | 251/28 |
| 3,862,781 | 1/1975 | King et al. | 303/22 R |
| 3,871,497 | 3/1975 | Bessiere | 60/545 |
| 4,207,914 | 6/1980 | Holloway et al. | 137/596.18 |
| 4,416,188 | 11/1983 | Katagiri et al. | 91/374 X |

FOREIGN PATENT DOCUMENTS 153183 12/1975 Japan .

Primary Examiner—Robert E. Garrett
Assistant Examiner—George Kapsalas
Attorney, Agent, or Firm—Oldham, Oldham & Weber Co.

[57] ABSTRACT

A brake system for a vehicle comprises a booster unit including a power piston disposed slidably in a housing for defining a first chamber and a second chamber in the housing, a regulator disposed slidably in the power piston, a flow restrictor formed between the first chamber and a fluid pressure source for restricting flow of fluid in response to movement of the regulator, a pilot pressure chamber disposed upstream of the flow restrictor, a movable member moved by the internal pressure of the pilot pressure chamber thereby permitting communication between the second chamber and the fluid pressure source, and a reaction spring disposed between the power piston and the regulator. A master cylinder is connected to the power piston of the booster unit to supply braking hydraulic fluid at controlled pressure to front and rear brakes, and a brake pedal actuates the regulator of the booster unit to cause movement of the regulator relative to the power piston.

9 Claims, 43 Drawing Figures

FIG. 29
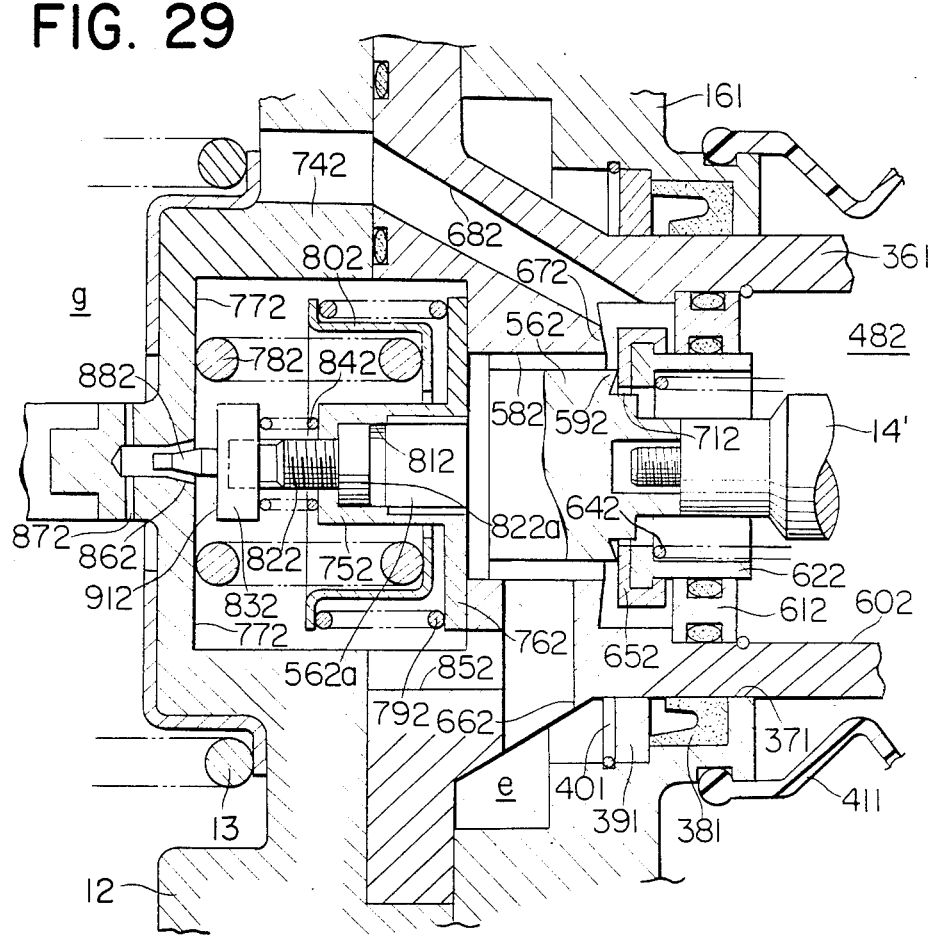
FIG. 30
FIG. 31
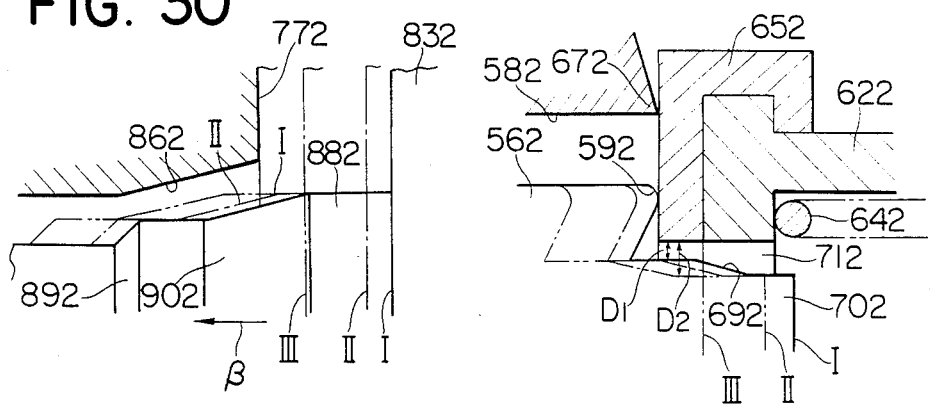

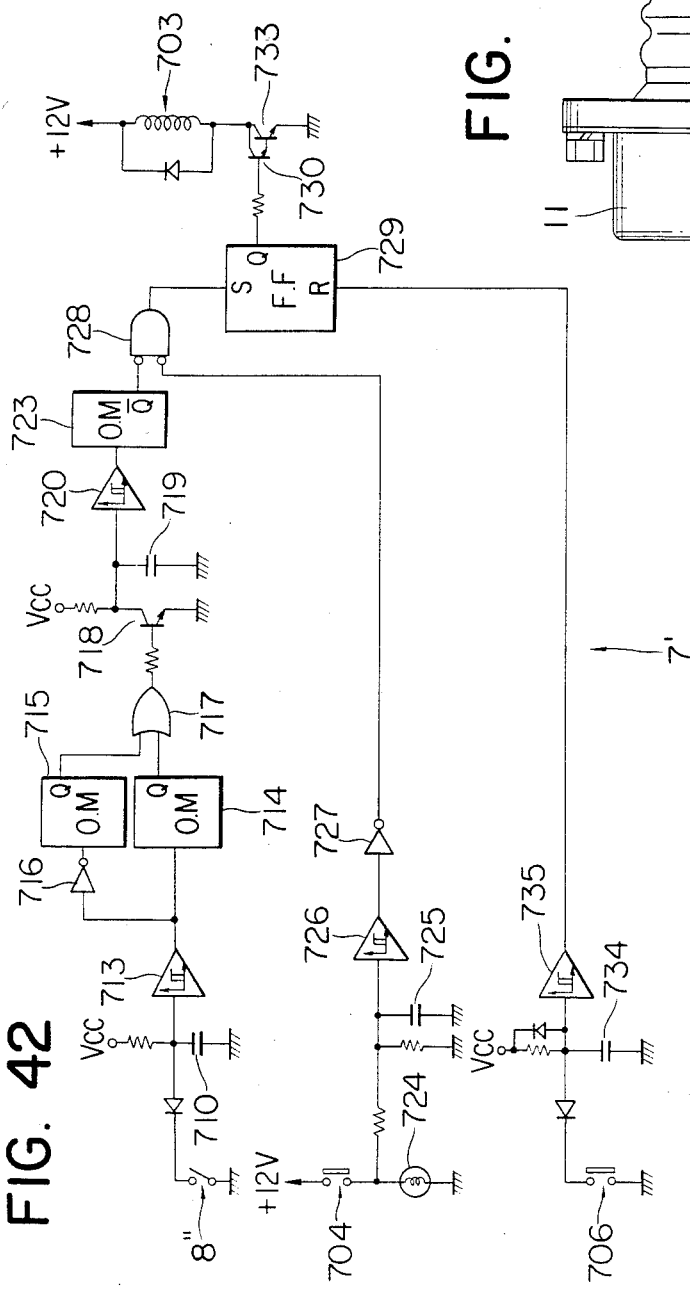
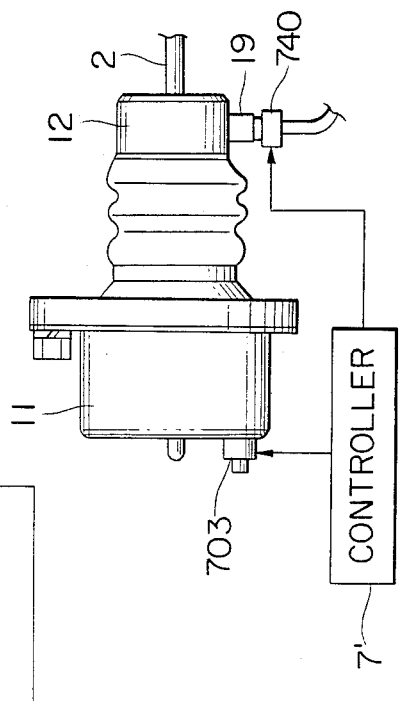
FIG. 42
FIG. 43

BRAKE SYSTEM FOR VEHICLES

BACKGROUND OF THE INVENTION

1. Field of the Invention

This invention relates to a brake system for vehicles, and more particularly to improvements in a booster unit actuating a master cylinder in such a brake system.

2. Description of the Prior Art

FIG. 1 shows schematically the structure of a prior art booster unit incorporated in a brake system for vehicles. As shown in FIG. 1, the prior art booster unit 01 includes a piston 02 operatively connected to a master cylinder (not shown), a regulator 03 disposed slidably in the piston 02 and connected at its left-hand end to a brake pedal (not shown) for movement by pedal depression and a return spring 04 interposed between the regulator 03 and the piston 02.

In response to the depression of the brake pedal for the purpose of braking, the regulator 03 is urged rightward in FIG. 1 against the force of the return spring 04, and a valve mechanism 05 is actuated to establish communication between a front chamber 06 and a pressure chamber 07, with the result that the piston 02 is urged rightward in FIG. 1 by the internal pressure of the pressure chamber 07. When the rightward stroke of the piston 02 becomes equal to the leftward stroke of the regulator 03, the valve mechanism 05 interrupts the communication between the front chamber 06 and the pressure chamber 07, and the force urging the piston 02 rightward is balanced by the reaction force of the master cylinder to stop the piston 02 in the balanced position. Then, when the brake pedal is depressed again, the booster unit 01 operates again in a manner as described above.

Therefore, in the brake system including the prior art booster unit 01, the reaction force (the brake pedal depression force) imparted through the regulator 03 is counteracted by the force of the return spring 04 compressed due to the relative displacement of the regulator 03 and piston 02, and such a force of the spring 04 is almost constant irrespective of the displacement of the brake pedal. The brake system including the prior art booster unit 01 has not thus been satisfactory in the feeling of brake pedal actuation when compared with a conventional brake system in which the brake pedal depression force increases with the increase in the brake pedal displacement.

SUMMARY OF THE INVENTION

It is an object of the present invention to provide a vehicle brake system of the type comprising a booster unit including a spring counteracting the force of brake pedal depression, in which the reaction force is produced in proportion to the displacement of the brake pedal thereby improving the feeling of brake pedal actuation.

Another object of the present invention is to provide a brake system of the type above described in which means are provided for decreasing the consumption of fluid supplied to the booster unit.

Still another object of the present invention is to provide a brake system of the type above described in which the booster unit functions to apply a braking force corresponding to the weight (the load plus the deadweight) of the vehicle so that the same brake pedal depression force can provide the same deceleration regardless of the weight of the vehicle.

In accordance with the present invention, there is provided a brake system for a vehicle comprising booster means including a housing, a power piston disposed slidably in the housing for defining a first chamber and a second chamber in the housing, a regulator disposed slidably in the power piston, flow restriction means provided between the first chamber and a fluid pressure source for restricting flow of fluid in response to movement of the regulator, a pilot pressure chamber disposed upstream of the flow restriction means, movable means moved by the internal pressure of the pilot pressure chamber thereby permitting communication between the second chamber and the fluid pressure source, and a reaction spring disposed between the power piston and the regulator; a master cylinder connected to the power piston of the booster means to supply braking hydraulic fluid at controlled pressure to front and rear brakes; and a brake pedal actuating the regulator.

BRIEF DESCRIPTION OF THE DRAWINGS

The above and other objects, features and advantages of the present invention will become apparent from the following detailed description of preferred embodiments thereof taken in conjunction with the accompanying drawings, in which:

FIG. 29 is an enlarged view of part of FIG. 28;

FIGS. 30 and 31 are enlarged views of part of FIG. 29;

FIG. 42 is a circuit diagram of the controller in the fifteenth embodiment shown in FIG. 41; and FIG. 43 is an elevation view of a modification of the fifteenth embodiment shown in FIG. 41.

DESCRIPTION OF THE PREFERRED EMBODIMENTS

Figure 1:
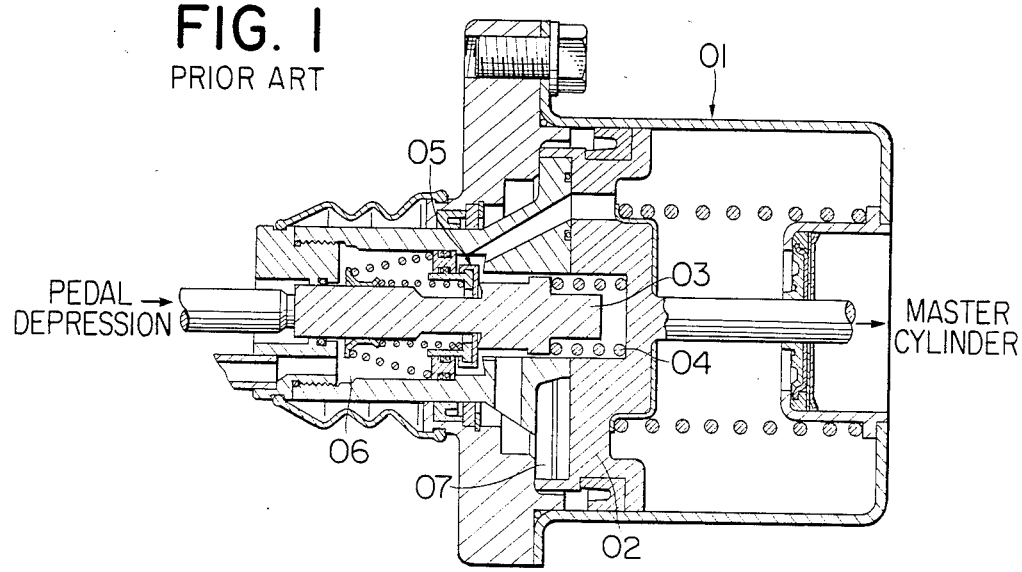
FIG. 1 is a sectional view of the prior art booster unit.
Figure 2:
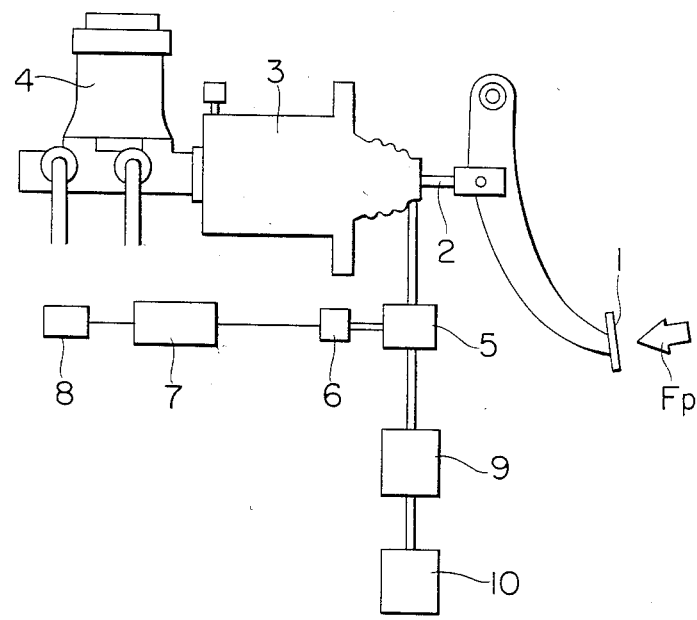
FIG. 2 is a schematic drawing of a first embodiment of the brake system according to the present invention.

Preferred embodiments of the present invention will now be described in detail, with reference to the drawings.

Referring to FIGS. 2 to 8 showing a first embodiment of the present invention, a booster unit 3 is actuated by a rod 2 arranged for interlocking operation with a brake pedal 1, and an amplified output from the booster unit 3 is transmitted to a master cylinder 4 supplying braking hydraulic fluid to individual wheel cylinders (not shown). A variable pressure control valve 5 controls the maximum pressure of compressed air supplied to the booster unit 3, and a drive unit 6 actuates the variable pressure control valve 5 to change the pressure of air. A controller 7 controls the drive unit 6 on the basis of a vehicle weight signal generated from a vehicle weight sensor (a vehicle load sensor or a vehicle height sensor) 8. Reference numerals 9 and 10 designate an accumulator and an air pressure source respectively.

Figure 3:
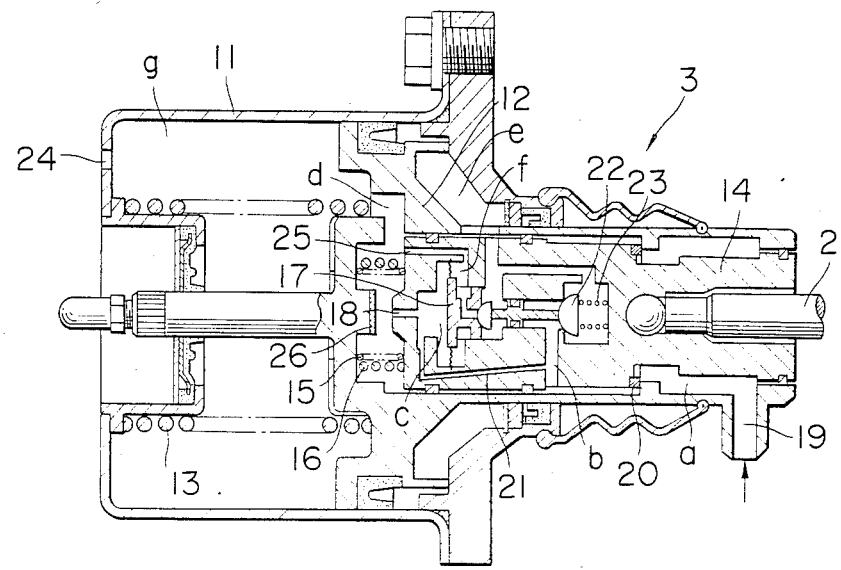
FIG. 3 is a sectional view of the booster unit in the first embodiment shown in FIG. 2.

Referring to FIG. 3, this booster unit 3 includes a housing 11 in which the power piston 12 connected to the master cylinder 4 by a rod is slidably disposed and biased toward the actuating rod 2 by a return spring 13, and the control valve member or regulator 14 actuated by the rod 2 is disposed so as to be slidable and movable relative to the power piston 12. Between the confronting portions of the power piston 12 and the regulator 14, a reaction spring 15 normally biasing the regulator 14 to move away from the power piston 12 is interposed together with the reaction spring 16 whose natural length is shorter than that of the spring 15. Formed in this regulator 14 is a pilot pressure chamber c one end of which is partitioned by a diaphragm member 17 and the other end of which opposes the power piston 12 and includes a nozzle 18 formed in the portion opposite to the power piston 12. The pressure chamber a formed in the power piston 12 communicates always with the pressure inlet port 19, and the pressure chamber b formed in the regulator 14 communicates with the pressure chamber a through the seal 20. A pilot air passage 21 acts as communicating means between the pressure chamber b and the pilot pressure chamber c so that a portion of the compressible fluid supplied to the pressure chamber b can be supplied to the pilot pressure chamber c. The seal 20 and the piston 12 cooperate to act as an on-off valve.

In order that the compressible fluid supplied to the pressure chamber b can act upon the power piston 12, a valve member 22 controlling the charge and discharge of the compressible fluid into and from the pressure chamber e is disposed between the pressure chambers e and b and is normally biased by a valve spring 23 toward the diaphragm member 17 to be normally brought into engagement with the diaphragm member 17. A pressure chamber d is defined between the confronting portions of the power piston 12 and the regulator 14 to communicate with the discharge port 24 provided in the housing 11 and also to communicate through a discharge passage 25 with a pressure chamber f formed on the side of the diaphragm member 17 nearer to the rod 2. These pressure chambers f and e are closed and opened by the movement of the valve member 22 toward and away from the diaphragm member 17. The valve member 22 and the diaphragm member 17 cooperate to provide a movable member. The power piston 12 and the housing 11 define therebetween the pressure chamber g communicating with the discharge port 24, and a pad 26 is mounted on the power piston 12 at the portion opposite to the nozzle 18. The nozzle 18 and the pad 26 cooperate to provide a flow restrictor.

In the absence of any depression force Fp imparted to the brake pedal 1, the booster unit 3 is in the state shown in FIG. 3. In this state of the booster unit 3, compressed air at regulated pressure supplied from the accumulator 9 to the booster unit 3 through the pressure inlet port 19 is supplied to the pressure chamber a but not supplied to the pressure chamber b by being shut off by the seal 20, and the pressure chambers c, d, f and g communicate with the atmosphere through the discharge port 24.

Then, when a depression force Fp is imparted to the brake pedal 1, the regulator 14 is urged leftward through the actuating rod 2, and, while compressing the spring 15, is displaced leftward in FIG. 3 relative to the power piston 12. Due to this relative movement of the regulator 14 and power piston 12, a gap is formed between the power piston 12 and the seal 20 to permit flow of compressed air from the pressure chamber a into the pressure chamber b. A very slight portion of compressed air flowing into this pressure chamber b flows through the pilot air passage 21 into the pilot pressure chamber c and flows thence through the nozzle 18 and pressure chambers d, g to be discharged to the atmosphere from the discharge port 24.

When the brake pedal 1 is further depressed in the above state, the spring 16 having the shorter natural lenght than the spring 15 starts to be compressed to increase the movement of the regulator 14 relative to the power piston 12, and the nozzle 18 approaches the pad 26 thereby increasing the back pressure at the nozzle 18, hence, increasing the internal pressure of the pilot pressure chamber c. As a result, the diaphragm member 17 is urged rightward in FIG. 3 to urge the valve member 22 in the same direction, and the pressure chamber b communicates with the pressure chamber e so that compressed air in the pressure chamber b is introduced into the pressure chamber e for actuating the power piston 12. Compressed air supplied into the pressure chamber e acts on the power piston 12, and the power piston 12 actuates the master cylinder 4 against the force of the return spring 13. At the same time, compressed air in the pressure chamber e urges the diaphragm member 17, and, when the internal pressure of the pressure chamber e builds up until it is balanced with the force due to the internal pressure of the pilot pressure chamber c, the valve member 22 is biased to its closed position again by the force of the valve spring 23.

Thus, the back pressure at the nozzle 18 is determined depending on the displacement of the regulator 14 relative to the power piston 12, and the corresponding internal pressure of the pressure chamber e, hence, the pressure acting on the power piston 12 is determined. The internal pressure of the pressure chamber e is in balance with that of the pilot pressure chamber c in the state in which the power piston 12 ceases to move after depression of the brake pedal 1. Therefore, the displacement of the regulator 14 relative to the power piston 12 corresponds to the output of the power piston 12, and the reaction springs 15 and 16 impart a reaction force corresponding to such displacement of the regulator 14.

On the other hand, when the depression force Fp having been imparted to the brake pedal 1 is released, the actuating rod 2 is retracted, and the regulator 14 is also retracted by the force of the springs 15 and 16. As a result, the gap between the pad 26 and the nozzle 18 is increased to cause a drop of the internal pressure of the pilot pressure chamber c, hence, a reduction of the nozzle back pressure. The balance between the internal pressure of the pilot pressure chamber c and that of the pressure chamber e is now lost, and the diaphragm member 17 is urged leftward in FIG. 3. A gap appears again between the valve member 22 and the associated portion of the diaphragm member 17 again, with the result that compressed air in the pressure chamber e having actuated the power piston 12 flows now into the pressure chamber f to be discharged to the atmosphere from the discharge port 24 after flowing through the discharge passage 25 and through the pressure chamber d and g. As a result, the internal pressure of the pressure chamber e drops to the atmospheric pressure level, and the power piston 12 is retracted by the force of the return spring 13 to release the brakes.

The structure and function of the variable pressure control valve 5 controlling the pressure of compressed air supplied to the booster unit 3 and those of the drive unit 6 setting the air pressure will be described with reference to FIGS. 4 and 5.

The variable pressure control valve 5, which is a pressure regulating valve of diaphragm type, includes a casing 27 in which a valve member 28 is disposed to control communication between an inlet pressure chamber h communicating with an air inlet port 29 and an outlet pressure chamber i communicating with an air outlet port 30. A diaphragm 31 is secured in the casing 27 to define on one side thereof a pressure chamber j and on the other side thereof an atmospheric pressure chamber communicating with the atmosphere through an atmospheric port 32 formed in the wall of the casing 27. The diaphragm 31 cooperates with the associated end of the valve member 28 to function as a valve which controls communication between the pressure chamber j and the atmospheric port 32. A communication port 33 is formed between the pressure chambers i and j so that the pressure of compressed air in the outlet pressure chamber i acts upon the diaphragm 31 through this communication port 33. On the other hand, a pressure adjusting spring 35 is interposed in the atmospheric pressure chamber between the diaphragm 31 and a pressure-adjusting threaded rod 34 making threaded engagement with the casing 27. The drive unit 6 includes a shaft coupling 36 connected to the pressure-adjusting threaded rod 34, a motor 37 coupled to the shaft coupling 36, a displacement sensor 38 measuring the displacement of the pressure-adjusting threaded rod 34 driven by the motor 37, and a rotation sensor 39 sensing the number of revolutions of the motor 37.

Figure 4:
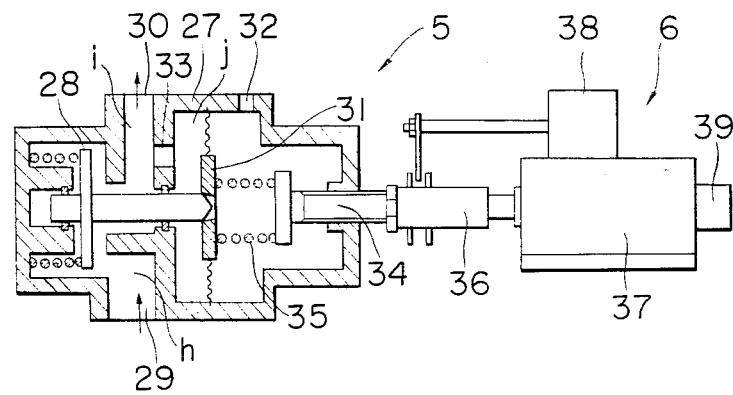
FIG. 4 is a sectional view of the variable pressure control valve and drive unit in the first embodiment shown in FIG. 2.

In operation, when the pressure-adjusting threaded rod 34 in the variable pressure control valve 5 having a structure as described above is driven by the drive unit 6 to move leftward in FIG. 4, compressed air flowing into the pressure chamber h through the inlet port 29 is conducted from the pressure chamber h into the pressure chamber i by passing around the valve member 28 to be supplied through the outlet port 30 to the inlet port 19 of the booster unit 3. When the internal pressure of the pressure chamber i having the outlet port 30 builds up beyond a certain level, the internal pressure of the pressure chamber j communicating with the pressure chamber i through the communication port 33 increases also and acts to urge the diaphragm 31 rightward in FIG. 4 against the force of the pressure adjusting spring 35. The valve member 28 is now urged rightward in FIG. 4 to interrupt communication between the pressure chambers h and i. In such a position of the valve member 28, a balance is reached between the internal pressures of the pressure chambers i and j by the function of the pressure-adjusting threaded rod 34.

Therefore, when the pressure-adjusting threaded rod 34 is advanced further leftward in FIG. 4, a balance at a higher pressure level is reached between the internal pressures of the pressure chambers i and j, and the pressure of air at the outlet port 30 also increases.

On the other hand, when the pressure-adjusting threaded rod 34 is retracted rightward in FIG. 4, the internal pressure of the pressure chamber j overcomes the force of the pressure adjusting spring 35, and the diaphragm 31 is urged further rightward in FIG. 4 to form a gap between it and the valve member 28. As a result, air in the pressure chamber j flows out through the atmospheric port 32, and the internal pressures of the pressure chambers i and j drop to the level of the atmospheric pressure.

In this manner, the pressure of compressed air can be changed or controlled as desired by shifting the position of the pressure-adjusting threaded rod 34 by the motor 37. Also, any loss of compressed air is not incurred since compressed air flows only when the brakes are to be applied.

The controller 7 functioning to set the pressure of compressed air determines the maximum output of the booster unit 3 required for generating the maximum braking force Fb suitable for braking the vehicle running under a certain operating condition. For this purpose, the controller 7 applies a drive command signal to the motor 37 of the drive unit 6 so as to set the pressure of compressed air.

When now the pitch of the pressure-adjusting threaded rod 34 is p mm/revolution, and the sensed number of revolutions of the motor 37 is N, the displacement y of the threaded rod 34 is expressed as follows:

$$y = p \cdot N$$

Figure 5:
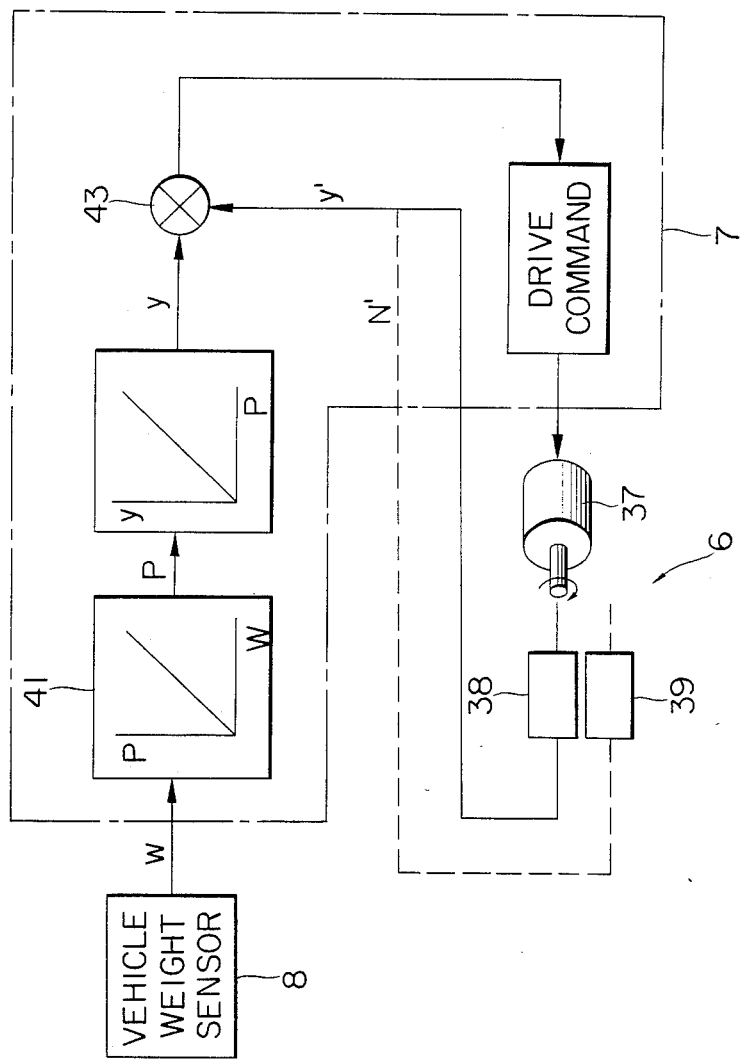
FIG. 5 is an explanatory drawing of the vehicle weight sensor, controller and drive unit in the first embodiment shown in FIG. 2.

Therefore, the drive command signal applied from the controller 7 to the motor 37 of the drive unit 6 to cause displacement $y = p \cdot N$ of the threaded rod 34 is, for example, such that the maximum pressure P of compressed air changes in proportion to the sensed weight W of the vehicle, as shown in FIG. 5.

In the first step, the weight W of the vehicle is sensed by the vehicle weight sensor 8, and, then, the maximum pressure P of compressed air to be supplied to the booster unit 3 for generating the maximum braking force Fb corresponding to the sensed weight W is set by a pressure setting unit 41 in the controller 7. Then, from the relation between the maximum pressure P of compressed air and the displacement y of the pressure-adjusting threaded rod 34, the required displacement y of the threaded rod 34 to be driven by the motor 37 or the required number of revolutions N of the motor 37 is set by a displacement or revolution setting unit 42 in the controller 7. The drive command signal indicative of, for example, the required displacement y thus determined is applied from the controller 7 to the motor 37 so that the motor 37 can attain the required number of revolutions. To ensure the required number of revolutions of the motor 37, a signal indicative of the actual displacement y' sensed by the displacement sensor 38 and a signal indicative of the actual number of revolutions N' sensed by the rotation sensor 39 are fed back to a comparator 43 in the controller 7.

Such a manner of pressure setting is not limited to the case where the weight W of the vehicle is automatically sensed by the vehicle weight sensor 8, and the drive command signal may be applied to the motor 37 from means such as switches which are selectively actuated by the driver who identifies that the weight W, hence, the load of the vehicle is, for example, light, medium or heavy.

It will thus be seen that, by the provision of the booster unit 3, variable pressure control valve 5, drive unit 6, controller 7 and vehicle weight sensor 8 in the brake system, the maximum output that can be produced from the booster unit 3 can be set and controlled as desired under command by the driver or under command determined by the sensed weight of the vehicle.

Referring to FIG. 3, the internal pressure Pe of the chamber e urging the power piston 12 in the booster unit 3 can be expressed as follows:

$$Pe = f(x, Pb)$$

where
x represents the displacement of the regulator 14 relative to the power piston 15, and the pressure of air is maximum when the pad 26 engages the nozzle 18 to shut off the air flow through the nozzle 18; and Pb represents the pressure of air supplied into the pressure chamber b through the inlet port 19.

When now the pressure Pb of air supplied into the pressure chamber b changes regardless of the same relative displacement x, the back pressure at the nozzle 18 changes, and, hence, the pressure Pe also changes.

Figure 6:
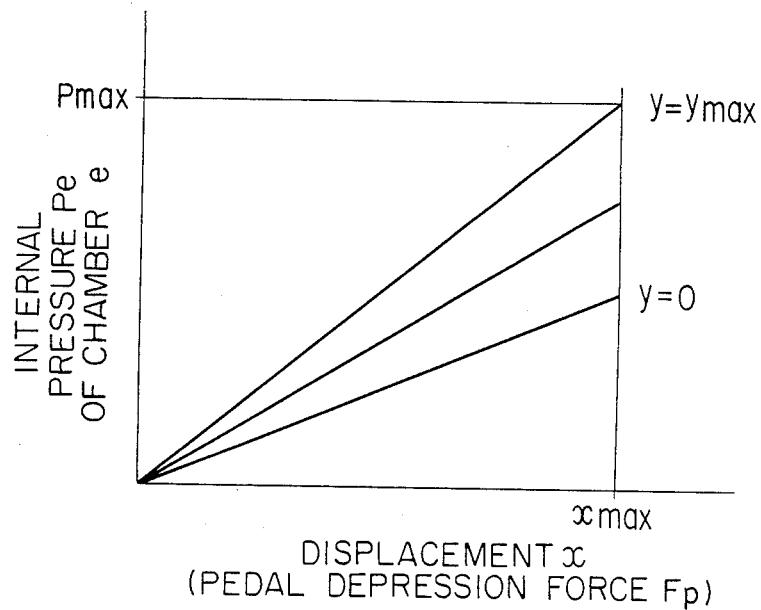
FIG. 6 is a graph showing the relation between the fluid pressure and the pedal displacement in the first embodiment shown in FIG. 2.

On the other hand, although the reaction force appearing due to the depression of the brake pedal 1 is determined by the combined repulsive force of the springs 15 and 16, this force of the springs 15 and 16 is determined only by the displacement x of the regulator 14 relative to the power piston 12. The same depression force Fp imparted to the brake pedal 1 provides the same relative displacement x, and, therefore, the same brake pedal depression force Fp can provide the pressure Pe of different values when the pressure Pb of supplied air is changed, as shown in FIG. 6.

Further, when the displacement y of the pressure-adjusting threaded rod 34 is set or determined depending on the sensed weight W of the vehicle in the manner above described, the braking force Fb required for braking the vehicle at a deceleration $\alpha$ is given by $Fb = W \cdot \alpha$, and the force Fm required to be applied to the master cylinder 4 to generate the required braking force Fb is expressed as $Fb = k \cdot Fm$, where k is a constant determined by various factors of the brake system.

This force Fm applied to the master cylinder 4 is generated by the power piston 12 in the booster unit 3. Further, this force Fm is provided by the combination of the leftward urging force of the rod 2 actuated by the brake pedal depression force and the fluid pressure built up in the chamber e of the booster unit 3. The rod 2 is mechanically connected to the brake pedal 1. Consequently, the required braking force Fb is provided by the combination of the depression force Fp imparted to the brake pedal 1 and the force Fe produced by the internal pressure Pe of the chamber e in the booster unit 3.

Suppose now that the weight W of the vehicle changes to (W+$\Delta$W). Then, it is necessary to chagne the braking force Fb by $\Delta Fb = \Delta W \cdot \alpha$ in order to attain the same deceleration $\alpha$ as that attained before the weight W is changed. Therefore, by previously setting the position or displacement y of the threaded rod 34 so that the fluid pressure corresponding to (Fb+$\Delta$Fb) can be produced in the booster unit 3 while maintaining the same displacement x of the regulator 14, the same depression force Fp imparted to the brake pedal 1 can provide the same deceleration $\alpha$ by application of the increased braking force (Fb+$\Delta$Fb), as will be apparent from FIGS. 7 and 8.

Thus, the same brake pedal depression force Fp can provide the same deceleration $\alpha$ regardless of a change of the weight W of the vehicle.

A modification of the booster unit 3 included in the first embodiment will be described with reference to FIG. 9.

Figure 9:
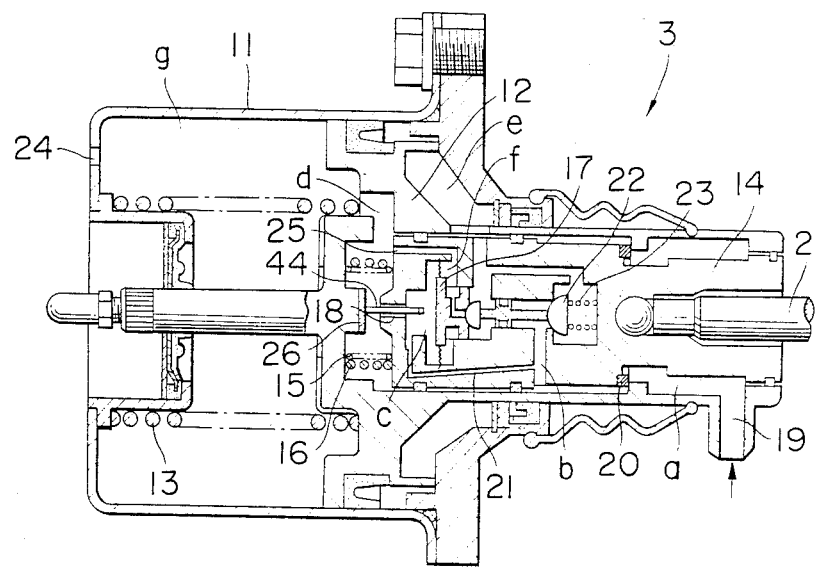
FIG. 9 is a sectional view of a modification of the booster unit shown in FIG. 3.

The booster unit 3 shown in FIG. 9 is so constructed that the valve member 22 can follow up without delay the rapid rate of depression of the brake pedal 1 in the case of emergency braking. Referring to FIG. 9, a valve actuating rod 44 extends through the nozzle 18 disposed opposite to the associated portion of the power piston 12, and its right-hand end terminates in a position adjacent to the diaphragm member 17. The length of this valve actuating rod 44 is adjusted so that the rod 44 can engage the diaphragm member 17 before the nozzle 18 engages the pad 26. The remaining structure of the booster unit 3 shown in FIG. 9 is entirely the same as that shown in FIG. 3, and any detailed description thereof is unnecessary.

The provision of this valve actuating rod 44 is effective in that the brakes are immediately actuated in response to the quick depression of the brake pedal 1 since, without resorting to the build-up of the internal pressure of the pilot pressure chamber c, the diaphragm member 17 is urged directly by the valve actuating rod 44 thereby permitting quick introduction of compressed air into the pressure chamber e for actuating the power piston 12.

Although the springs 15 and 16 of coil form are interposed between the power piston 12 and the regulator 14 in FIGS. 3 and 9, they may be of any other form such as a Belleville type.

A second embodiment of the present invention shown in FIGS. 10 to 13 is a modification of the first embodiment in that the pressure of hydraulic fluid discharged from the master cylinder 4 is controlled by a pressure control valve assembly depending on the sensed weight of the vehicle, instead of controlling the pressure of compressed air flowing into the booster unit 3 depending on the sensed vehicle weight. In FIGS. 10 to 13, the same reference numerals are used to designate equivalent parts appearing in the first embodiment to dispense with detailed description of such parts.

Figure 10:
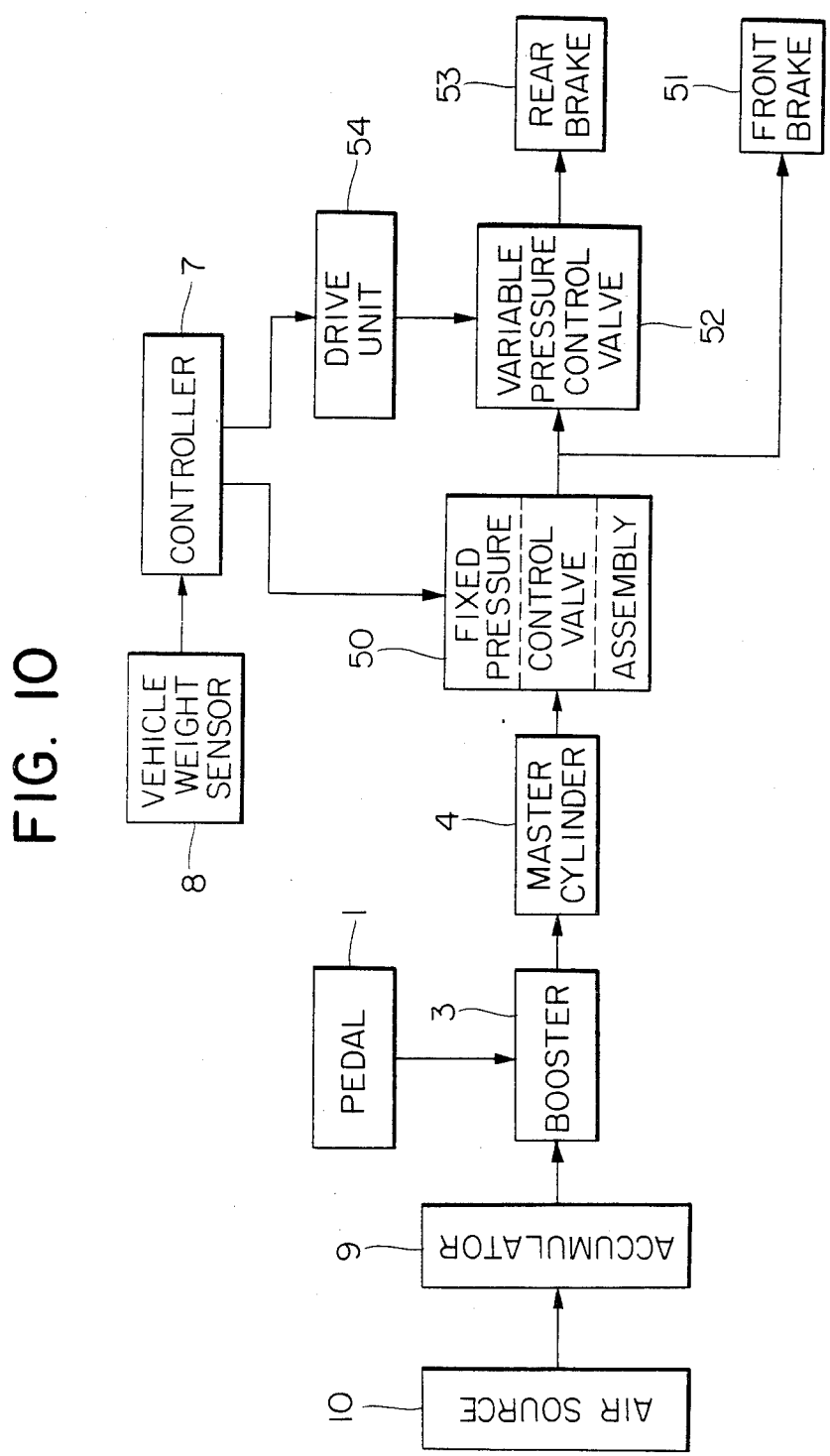
FIG. 10 is a block diagram of a second embodiment of the present invention.

Referring to FIG. 10, compressed air is supplied from the air pressure source 10 and the accumulator 9 to the booster unit 3 during application of brakes so as to drive the booster unit 3 in response to the depression force imparted to the brake pedal 1, and the amplified output from the booster unit 3 actuates the master cylinder 4. The pressure of braking hydraulic fluid produced by the master cylinder 4 is controlled by a fixed pressure control valve assembly 50 depending on the sensed weight of the vehicle. The braking hydraulic fluid at controlled pressure is supplied directly to front brakes 51 and is also supplied to rear brakes 53 after its pressure is further controlled by a variable pressure control valve 52 depending on the sensed vehicle weight. A weight signal appearing from a vehicle weight sensor 8 sensing the displacement of the vehicle body relative to the wheels is applied to a controller 7, and, on the basis of the input signal, the controller 7 actuates a drive unit 54 driving the variable pressure control valve 52 for the flow rate control. The fixed pressure control valve assembly 50 includes three pressure control circuits having different operating characteristics, and the controller 7 acts to selectively actuate one of these three pressure control circuits corresponding to the vehicle weight indicated by the weight signal applied from the vehicle weight sensor 8.

Figure 11:
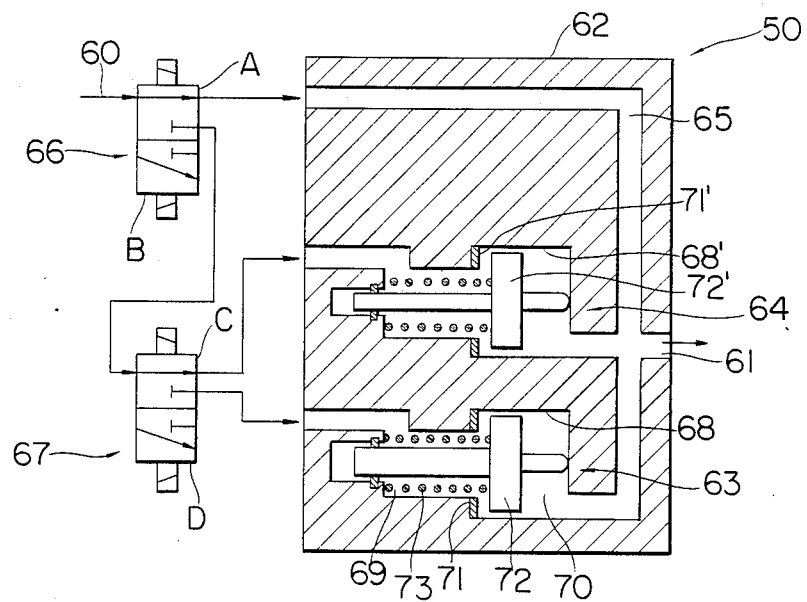
FIG. 11 is a sectional view of the fixed pressure control valve assembly in the second embodiment shown in FIG. 10.

Referring to FIG. 11, the fixed pressure control valve assembly 50 controls the pressure of braking hydraulic fluid from the master cylinder 4 depending on the sensed vehicle weight and includes a first pressure control circuit including a pressure control valve 63 disposed in a housing 62 for supplying the hydraulic fluid from an inlet conduit 60 connected to the master cylinder 4 to an outlet port 61 connected to the front brakes 51 and the variable pressure control valve 52, a second pressure control circuit including a pressure control valve 64 for supplying the hydraulic fluid at regulated pressure to the outlet port 61 with a characteristic different from that of the pressure control valve 63, a third pressure control circuit including a communication passage 65 formed in the housing 62 for directly supplying the hydraulic fluid from the inlet conduit 60 to the outlet port 61, and two selector valves 66 and 67 of, for example, electromagnetically operated type for selectively changing over the path of the hydraulic fluid supplied from the inlet conduit 60 so as to supply the hydraulic fluid to the selected one of the pressure control circuits.

The selector valve 66 is changed over between a position A at which the hydraulic fluid from the inlet conduit 60 is supplied to the communication passage 65 and a position B at which the hydraulic fluid is supplied to the selector valve 67. The selector valve 67 is changed over between a position C at which the supplied hydraulic fluid is supplied to the pressure control valve 64 and a position D at which the hydraulic fluid is supplied to the pressure control valve 63. The selector valves 66 and 67 are changed over under control of the controller 7.

Since the fundamental structure and function of the two pressure control valves 63 and 64 are substantially the same, the structure and function of the pressure control valve 63 will only be described, and those of the other pressure control valve 64 will be dispensed with while affixing the dash to the corresponding parts of the valve 64.

The pressure control valve 63 includes a piston-shaped valve member 72 slidably disposed in a stepped bore 68 formed in the housing 62 to define an inlet pressure chamber 69 and an outlet pressure chamber 70 and also to cooperate with an annular seal 71 mounted on a step portion of the bore 68 for controlling communication between the two pressure chambers 69 and 70, and a spring 73 interposed between the wall of the bore 68 and the valve member 72 to normally bias the valve member 72 rightward or toward the open position shown in FIG. 11. The inlet pressure in the inlet pressure chamber 69 acting upon the end having a small pressure receiving area provides a force tending to urge the valve member 72 rightward or in the opening direction, and the outlet pressure in the outlet pressure chamber 70 acting upon the end having a large pressure receiving area provides a force tending to urge the valve member 72 leftward or in the closing direction. Due to the fact that the force of the spring 73 is very weak or is merely required to position the valve member 72 in the open position, the output pressure is maintained at a low level corresponding to the ratio between the two pressure receiving areas of the valve member 72. Further, because of the fact that the rod diameter of the valve member 72 in the pressure control valve 63 is larger than that of the valve member 72' in the pressure control valve 64, the ratio between the pressure receiving areas of the pressure control valve 63 is larger than that of the pressure control valve 64, and, therefore, the outlet pressure of the former is lower than that of the latter.

Figure 12:
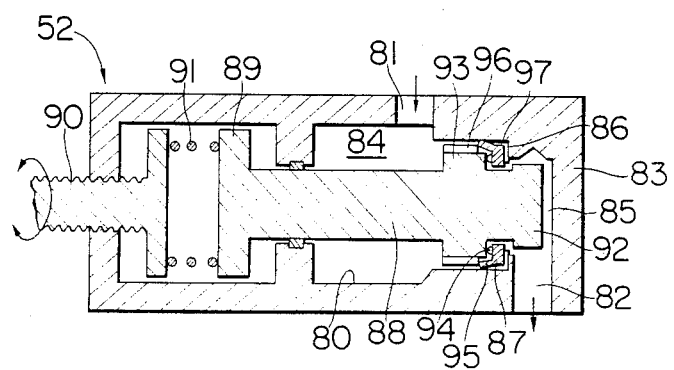
FIG. 12 is a sectional view of the variable pressure control valve in the second embodiment shown in FIG. 10.

Referring to FIG. 12, the variable pressure control valve 52 controls the pressure of braking hydraulic fluid supplied to the rear brakes 53 depending on the pressure of the controlled braking hydraulic fluid supplied from the fixed pressure control valve assembly 50, depending on the pressure of hydraulic fluid in the rear brakes 53 and also depending on the weight of the vehicle. This variable pressure control valve 52 includes a housing 83 formed with a stepped bore 80, an inlet port 81 connected to the fluid outlet 61 of the fixed pressure control valve assembly 50 and an outlet port 82 connected to the rear brakes 53, a piston-shaped valve member 88 slidably disposed in the bore 80 to define an inlet pressure chamber 84 and an outlet pressure chamber 85 and also to cooperate with an annular seal 87 mounted on a step portion 86 of the bore 80 for controlling communication between the two pressure chambers 84 and 85, and a spring 91 interposed between the large-diameter left-hand end 89 of the valve member 88 and an adjusting screw 90 making threaded engagement with the housing 83 to normally bias the valve member 88 rightward or toward the open position shown in FIG. 12.

In this open position of the variable pressure control valve 52, the small-diameter right-hand end 92 of the valve member 88 is not engaged by the seal 87, and a land 93 of the valve member 88 is engaged by a plurality of projections 94 provided on the seal 87 in circumferentially spaced apart relation. Further, in the illustrated open position, an annular lip 95 of the seal 87 is in pressure engagement with the inner surface of the bore 80. Therefore, the inlet pressure chamber 84 communicates with the outlet pressure chamber 85 through a plurality of grooves 96 formed on the outer periphery of the land 93 and through the gap between the seal 87 and the valve member 88. The seal 87 is formed at its bottom and outer peripheral portions with grooves 97 which permit flow of the hydraulic fluid from the outlet pressure chamber 85 toward the inlet pressure chamber 84 when the brakes are released. The adjusting screw 90 is connected at the end (not shown) in rotary relation to the drive unit 54 similar in structure to the drive unit 6 shown in FIG. 4. When the adjusting screw 90 is rotated in one direction, it moves toward the valve member 88 to increase the set force of the spring 91, while when it is rotated in the opposite direction, it moves away from the valve member 88 to decrease the set force of the spring 91.

The operation of the brake system will now be described.

When depression force is imparted to the brake pedal 1 for the purpose of braking, the regulator 14 of the booster unit 3 is displaced relative to the power piston 12 depending on the depression force, and the internal pressure is built up in the pressure chamber e depending on the relative displacement of the regulator 14 and the power piston 12. Consequently, the power piston 12 is moved to actuate the master cylinder 4.

The braking hydraulic fluid produced by the operation of the master cylinder 4 flows through the communication passage 65 of the fixed pressure control valve assembly 50 or is regulated by the pressure control valve 63 or 64 thereof depending on the sensed weight of the vehicle, as explained in detail hereinafter. This braking hydraulic fluid from the fixed pressure control valve assembly 50 is supplied directly to the front brakes 51 and is also supplied to the inlet pressure chamber 84 of the variable pressure control valve 52. Since the valve member 88 of this valve 52 is normally in its open position shown in FIG. 12, the hydraulic fluid flows into the outlet pressure chamber 85 through the gap between the seal 87 and the valve member 88 and is then supplied to the rear brakes 53 to apply a rear-wheel braking force equal to the front-wheel braking force.

The outlet pressure in the outlet pressure chamber 85 acting upon the right-hand end 92 having a large pressure receiving area provides a force tending to urge the valve member 88 leftward. Further, the combination of the inlet pressure in the inlet pressure chamber 84 acting upon the left-hand peripheral portion of the land 93 having a small pressure receiving area and the force of the spring 91 provides a force tending to urge the valve member 88 rightward. Therefore, with the increase in the pressure of the hydraulic fluid supplied from the fixed pressure control valve assembly 50, the inlet pressure and the outlet pressure increase equally. When finally the point (which will be referred to hereinafter as a transition point) at which the leftward and rightward urging forces balance each other is exceeded, the leftward urging force overcomes the rightward urging force to urge the valve member 88 leftward. The right-hand end 92 of the valve member 88 approaches the seal 87 to limit communication between the inlet pressure chamber 84 and the outlet pressure chamber 85. After the transition point is exceeded, the outlet pressure is maintained at a level lower than the inlet pressure in a relation proportional to the ratio between the two pressure receiving areas of the valve member 88. As a result, after the transition point is exceeded, the rate of increase of the rear-wheel braking force is maintained lower than that of the front-wheel braking force thereby preventing locking of the rear wheels.

When the depression force having been imparted to the brake pedal 1 is released for releasing the brakes, the power piston 12 is returned by the spring 13, and the output from the booster unit 3 to the master cylinder 4 is also released.

At the same time, due to the pressure drop of the hydraulic fluid from the master cylinder 4, the pressure of the hydraulic fluid supplied to the front brakes 51 and variable pressure control valve 52 through the fixed pressure control valve assembly 50 also drops. Due to the drop of the inlet pressure in the inlet pressure chamber 84 of the valve 52, the leftward urging force increases to bring the right-hand end 92 of the valve member 88 into engagement with the seal 87 thereby interrupting communication between the pressure chambers 84 and 85. The outlet pressure higher than the inlet pressure acts upon the lip 95 through the grooves 97 to move the lip 95 away from the surface of the bore 80, with the result that the hydraulic fluid in the rear brakes 53 is discharged into the master cylinder 4 through the outlet pressure chamber 85, through the gap between the lip 95 of the seal 87 and the bore 80 and through the inlet pressure chamber 84. When the rightward urging force overcomes the leftward urging force due to the drop of the outlet pressure, the valve member 88 is urged to the open position shown in FIG. 12 again, and the hydraulic fluid in the rear brakes 53 is completely discharged into the master cylinder 4 through the gap between the seal 87 and the valve member 88.

The above description has referred to the operation of the brake system when the weight of the vehicle is fixed or not changed. When, on the other hand, the weight changes, the pressure of the braking hydraulic fluid from the master cylinder 4 is regulated by the fixed pressure control valve assembly 50 to meet such a change of the weight, so that the desired deceleration can always be attained regardless of the change of the weight. Also, since the value of the ratio between the outlet pressure and the inlet pressure in the variable pressure control valve 52 is a constant determined by the ratio between the two pressure receiving areas of the valve member 88, and since these pressure receiving areas are also constant, the outlet pressure is proportional to the force of the spring 91, that is, the outlet pressure is increased or decreased by increasing or decreasing the force of the spring 91. Therefore, when the force of the spring 91 is changed in a relation corresponding to a change of the vehicle weight, the transition point for the rear-wheel braking force is also changed so that the desired distribution of the front-wheel and rear-wheel braking forces can be obtained.

To this end, the vehicle weight W is sensed by the vehicle weight sensor 8, and the weight signal indicative of the sensed weight is applied to the controller 7. In response to the application of the weight signal from the sensor 8, the controller 7 identifies one of predetermined weight ranks, that is, for example, a rank $W_1$ corresponding to a no-loaded condition, a rank $W_2$ corresponding to a half-loaded condition and a rank $W_3$ corresponding to a full-loaded condition, and controls the selector valves 66 and 67 so that one of the pressure control circuits corresponding to the identified weight rank is actuated in the fixed pressure control valve assembly 50. Also, on the basis of the weight signal, the data representing the force of the spring 91 in the variable pressure control valve 52, suitable for the sensed weight W, are fetched by the controller 7 from a table of pre-set characteristic data, and the required displacement of the adjusting screw 90 is determined by the controller 7 to drive the motor (37) of the drive unit 54. Also, the controller 7 compares the predetermined displacement of the adjusting screw 90 with the actual displacement detected by the rotation sensor (39) or displacement sensor (38) for the purpose of feedback control.

Such a control mode of the fixed pressure control valve assembly 50 will now be described.

When now the controller 7 detects the weight rank $W_1$, the selector valve 66 is changed over to the position B, and the selector valve 67 is changed over to the position D. As a result, the hydraulic fluid from the inlet conduit 60 is supplied to the pressure control valve 63 in which the ratio between the pressure receiving areas is larger than that of the pressure control valve 64, and the valve member 72 cooperates with the seal 71 to lower the outlet pressure than the inlet pressure in proportion to the above ratio thereby setting the outlet pressure at a predetermined low level. On the other hand, when the controller 7 detects the weight rank $W_2$, the selector valve 67 is changed over to the position C, while the selector valve 66 is maintained in the position B. The hydraulic fluid from the inlet conduit 60 is supplied to the pressure control valve 64 in which the ratio between the pressure receiving areas is smaller than that of the pressure control valve 63, and the valve member 72' cooperates with the seal 71' to lower the outlet pressure than the inlet pressure in proportion to the above ratio thereby setting the outlet pressure at a predetermined intermediate level. Further, when the controller 7 detects the weight rank $W_3$, the selector valve 66 is changed over to the position A. The hydraulic fluid from the inlet conduit 60 is supplied to the communication passage 65 to be directly supplied to the outlet port 61. In this manner, the hydraulic fluid from the master cylinder 4 is regulated to meet the detected weight rank, and the hydraulic fluid at the regulated pressure is supplied to the front brakes 51 and variable pressure control valve 52.

The reaction force appearing in response to the depression of the brake pedal 1 is determined by the reaction force of the spring 15 and 16. The reaction force of the springs 15 and 16 is determined by the displacement of the regulator 14 relative to the power piston 12, and this means that the brake pedal depression force is the same and the output of the booster unit 3 is also the same when the displacement of the regulator 14 is the same. Also, since the booster unit 3 is mechanically connected to the master cylinder 4, the output of the booster unit 3 and the pressure of the braking hydraulic fluid produced by the master cylinder 4 are in a proportional relation.

Figure 13:
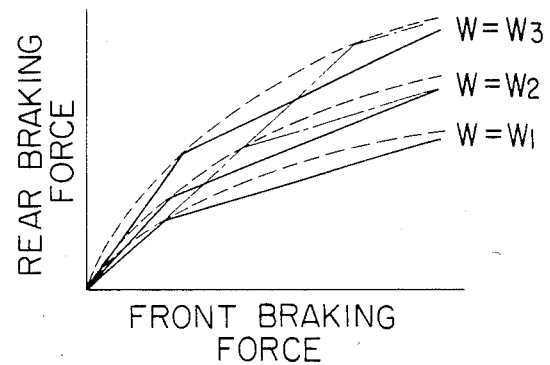
FIG. 13 is a graph showing the relation between the front-wheel braking force and the rear wheel braking force in the second embodiment shown in FIG. 10.

Thus, depending on the weight rank of the vehicle, the corresponding one of the pressure control circuits of the fixed pressure control valve assembly 50 is selectively operated, so that the same depression force imparted to the brake pedal 1 can change the pressure of the braking hydraulic fluid produced by the master cylinder 4. Therefore, the braking force characteristic relative to the brake pedal depression force as shown in FIG. 13 can be exhibited.

The control function of the variable pressure control valve 52 will next be described.

When the sensed vehicle weight W is $W_1$, the motor of the drive unit 54 is rotated by the amount corresponding to $W_1$ under control of the controller 7 to rotate the adjusting screw 90 in one direction thereby urging it to the predetermined leftwardmost position, so that the force of the spring 91 biasing the valve member 88 rightward is set at its predetermined minimum. As a result, the outlet pressure at the transition point is reduced to a certain low level. On the other hand, when the sensed vehicle weight W is $W_3$, the motor of the drive unit 54 is correspondingly driven under control of the controller 7 to rotate the adjusting screw 90 in the opposite direction until it is urged to its predetermined rightwardmost position. As a result, the force of the spring 91 is set at its predetermined maximum, and the outlet pressure at the transition point is raised to a certain high level. When the sensed vehicle weight W is $W_2$ which is intermediate between $W_1$ and $W_3$, the adjusting screw 90 is brought by the drive unit 54 to a predetermined intermediate position between the leftwardmost and rightwardmost positions under control of the controller 7, and the force of the spring 91 and the outlet pressure are set at predetermined intermediate values.

Figure 7:
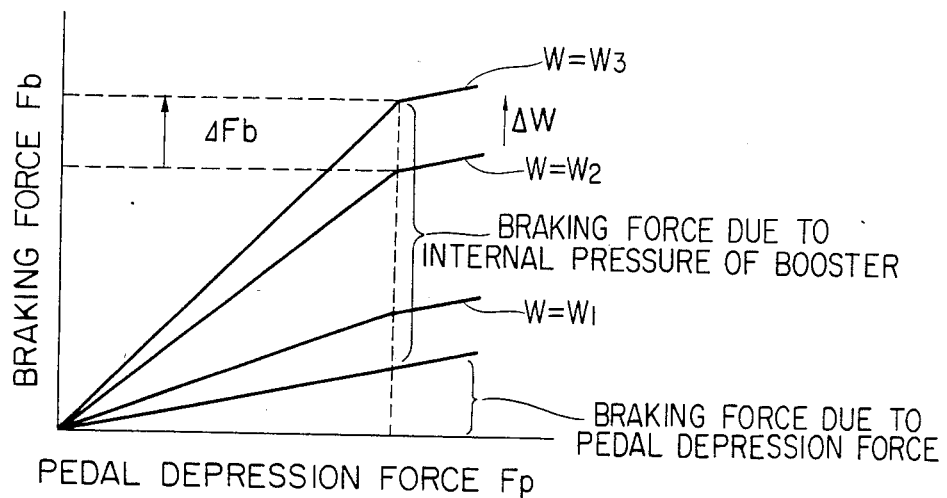
FIG. 7 is a graph showing the relation between the pedal depression force and the braking force in the first embodiment shown in FIG. 2.
Figure 8:
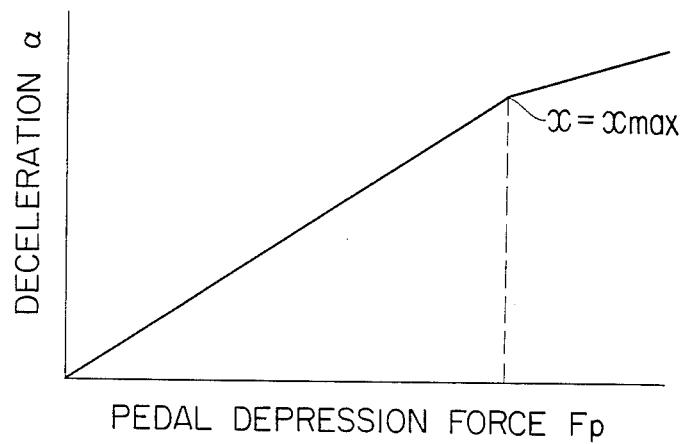
FIG. 8 is a graph showing the relation between the pedal depression force and the deceleration in the first embodiment shown in FIG. 2.

Such an operation of the variable pressure control valve 52 is effected in synchronous relation with the operation of the fixed pressure control valve assembly 50. Consequently, the braking hydraulic fluid at the pressure changing depending on the weight rank of the vehicle is directly supplied from the master cylinder 4 to the front brakes 51 in spite of the same brake pedal depression force, thereby exhibiting the characteristic of the front-wheel braking force as shown in FIG. 7. In the case of the rear brakes 53, the braking hydraulic fluid is applied thereto after being reduced to a different level in response to a change of the vehicle weight.

Thus, the front-wheel braking force and the rear-wheel braking force have various proportions as shown by the solid curves in FIG. 13.

Therefore, according to the second embodiment of the present invention, the same brake pedal depression force can provide the same deceleration regardless of a change of the weight of the vehicle, and impartation of a small depression force to the brake pedal 1 in a light-loaded condition can prevent locking of the rear wheels, so that the desired braking stability and high braking efficiency can be maintained regardless of the vehicle weight.

In FIG. 13, the chain curves represent the distribution of the front-wheel and rear-wheel braking forces controlled by the variable pressure control valve 52 in the case where the front-wheel braking force, that is, the pressure of the braking hydraulic fluid from the master cylinder 4 does not change in spite of a change of the vehicle weight, while broken curves represent the ideal distribution of the front-wheel and rear-wheel braking forces.

In the aforementioned embodiment shown in FIGS. 10 to 13, the set force of the spring 91 in the variable pressure control valve 52 is continuously regulated by the electrical means including the vehicle weight sensor 8, controller 7 and drive unit 54. However, an air pressure may be utilized to continuously change the biasing force urging the valve member 88 toward its open position. In a vehicle equipped with suspensions of air spring type, the air pressure of the air springs is proportional to the weight of the vehicle. Therefore, this air pressure may be utilized as the weight signal, and means responsive to this signal may be provided for changing the set force of the spring 91 or changing the biasing force urging the valve member 88 toward its open position.

Figure 14:
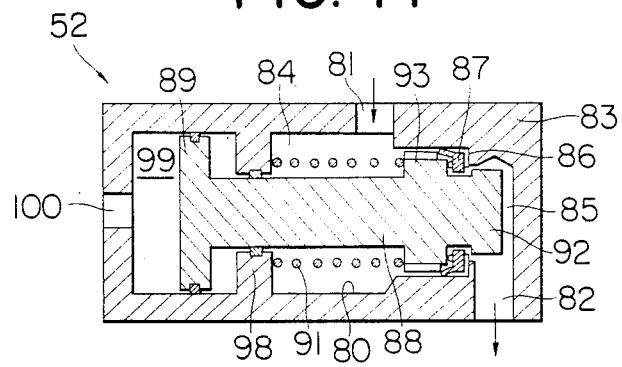
FIG. 14 is a sectional view of a modification of the variable pressure control valve shown in FIG. 12.

FIG. 14 shows a partial modification of the second embodiment when such air-pressure controlled actuating means is used. In FIG. 14, the same reference numerals are used to designate equivalent parts appearing in FIG. 12.

In the modified variable pressure control valve 52 shown in FIG. 14, the spring 91 is interposed between the land 93 of the valve member 88 and a partition wall 98 of the inlet pressure chamber 84 to normally urge the valve member 88 toward its open position by a predetermined set force. The left-hand end 89 of the valve member 88 makes sealing and sliding engagement with the inner surface of the bore 80 to define a control pressure chamber 99 together with the end wall of the bore 80. This control pressure chamber 99 is connected directly to the air springs through an inlet port 100. The remaining structure is entirely the same as that shown in FIG. 12.

The operation of this modified variable pressure control valve 52 is substantially the same as that described with reference to FIG. 12. In the case of FIG. 14, the predetermined force of the spring 91 acts upon the valve member 88 together with the rightward urging force due to the internal air pressure of the control pressure chamber 99 acting upon the pressure receiving area of the left-hand end 89, and this air pressure is proportional to the weight of the vehicle. Therefore, depending on a change of the vehicle weight, the rightward urging force urging the valve member 88 toward the open position changes to change the transition point of the rear-wheel braking force.

Therefore, this modification can also exhibit the effect equivalent to that of the second embodiment.

In the second embodiment above described, although the valve member 88 of the variable pressure control valve 52 is adapted to respond to the internal pressures of the inlet and outlet pressure chambers, it may be adapted to respond to the internal pressure of the outlet pressure chamber only. In such a case, the structure is such that the urging force due to the outlet pressure acting upon the pressure receiving area of the valve member 88 balances with the urging force due to the variable force of the spring 91 in the embodiment shown in FIG. 12 or with the urging force due to the constant force of the spring 91 and the variable air pressure in the control pressure chamber 99 in the modification shown in FIG. 14, thereby controlling the outlet pressure.

Also, in the second embodiment, the three pressure control circuits are provided to deal with the classification of the vehicle weight into the three ranks. However, the number of the pressure control circuits is optional, and the larger the number of them, the braking fluid pressure can be more closely controlled to meet the sensed vehicle weight.

Figure 15:
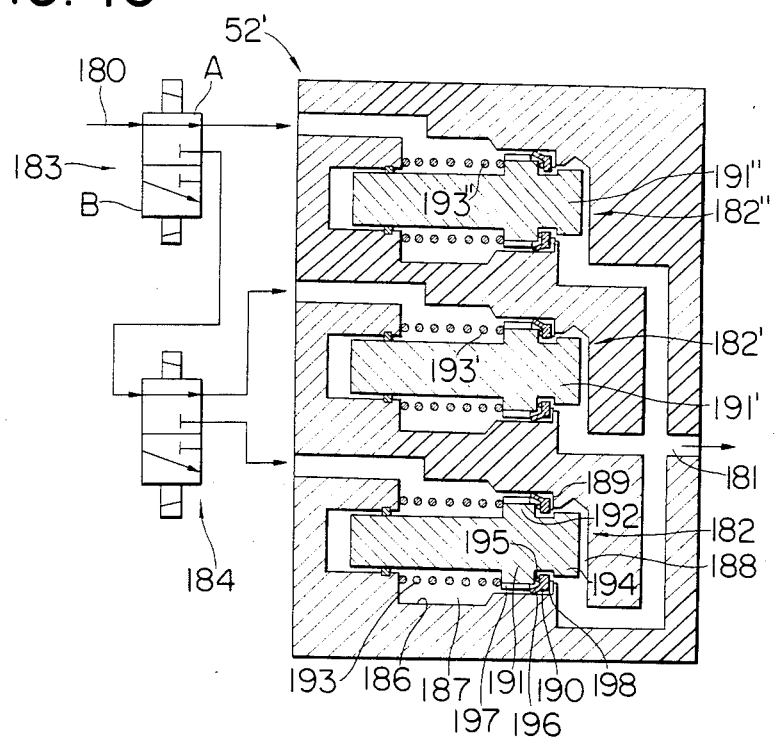
FIG. 15 is a sectional view of the fixed pressure control valve assembly in a third embodiment of the present invention.

FIG. 15 shows a third embodiment of the present invention. In this third embodiment, the variable pressure control valve 52 shown in FIG. 12 is replaced by a fixed pressure control valve assembly 52' to eliminate the provision of the drive unit 54, and this fixed pressure control valve assembly 52' is controlled directly by the controller 7.

The fixed pressure control valve assembly 52' in this third embodiment includes three pressure control valves having different operating characteristics, and the controller 7 acts to selectively actuate one of these three pressure control valves corresponding to the vehicle weight indicated by the weight signal applied from the vehicle weight sensor 8.

More precisely, the fixed pressure control valve assembly 52' includes three pressure control valves 182, 182' and 182" supplying the braking hydraulic fluid at regulated pressure to an outlet port 181 connected to the rear brakes 53, and two selector valves 183 and 184 of, for example, electromagnetically operated type for selectively changing over the path of the hydraulic fluid supplied from an inlet conduit 180 connected to the fixed pressure control valve assembly 50 so as to selectively supply the braking hydraulic fluid to one of the pressure control valves 182, 182' and 182".

The selector valve 183 is changed over between a position A at which the hydraulic fluid from the inlet conduit 180 is supplied to the pressure control valve 182" and a position B at which the hydraulic fluid is supplied to the selector valve 184. The selector valve 184 is changed over between a position C at which the supplied hydraulic fluid is supplied to the pressure control valve 182' and a position D at which the hydraulic fluid is supplied to the pressure control valve 182. The selector valves 183 and 184 are changed over under control of the controller 7.

Since the fundamental structure and function of these three pressure control valves 182, 182' and 182" are substantially the same, the structure and function of the pressure control valve 182 will only be described, and those of the remaining two pressure control valves 182' and 182" will be dispensed with while affixing the dash and double dash to the corresponding parts of the valves 182' and 182".

The pressure control valve 182 includes a piston-shaped valve member 191 slidably disposed in a stepped bore 186 formed in a housing 185 to define an inlet pressure chamber 187 and an outlet pressure chamber 188 and also to cooperate with an annular seal 190 mounted on a step portion 189 of the bore 186 for controlling communication between the two pressure chambers 187 and 188, and a spring 193 interposed between the wall of the bore 186 and a land 192 of the valve member 191 to normally bias the valve member 191 rightward or toward the open position shown in FIG. 15.

In this open position of the pressure control valve 182, the small-diameter right-hand end 194 of the valve member 191 is not engaged by the seal 190, and the land 192 of the valve member 191 is engaged by a plurality of projections 195 provided on the seal 190 in circumferentially spaced apart relation. Further, in the illustrated open position, an annular lip 196 of the seal 190 is in pressure engagement with the inner surface of the bore 186. Therefore, the inlet pressure chamber 187 communicates with the outlet pressure chamber 188 through a plurality of grooves 197 formed on the outer periphery of the land 192 and through the gap between the seal 190 and the valve member 191. The seal 190 is formed at its bottom and outer peripheral portions with grooves 198 which permit flow of the hydraulic fluid from the outlet pressure chamber 188 toward the inlet pressure chamber 187 when the brakes are released.

Set forces $F_1$, $F_2$ and $F_3$ of the respective springs 193, 193' and 193'' of the pressure control valves 182, 182' and 182'' are different and set as $F_1 < F_2 < F_3$ so as to provide the different characteristics of distribution of the front-wheel and rear-wheel braking forces corresponding to the vehicle weight ranks $W_1$, $W_2$ and $W_3$ identified by the controller 7.

The fundamental function of the individual pressure control valves 182, 182' and 182'' is substantially the same as that of the variable pressure control valve 52 shown in FIG. 12, and any detailed description thereof is unnecessary.

The control function of the fixed pressure control valve assembly 52' will now be described in detail.

When now the controller 7 detects the weight rank $W_1$, the selector valve 183 is changed over to the position B, and the selector valve 184 is changed over to the position D. As a result, the hydraulic fluid supplied from the inlet conduit 180 during braking is supplied to the rear brakes 53 through the pressure control valve 182 and outlet port 181. Since this valve 182 has a small set force $F_1$ of its spring 193, the above manner of operation of the valve 182 sets the outlet pressure of the transition point at a predetermined low level. On the other hand, when the controller 7 detects the weight rank $W_2$, the selector valve 184 is changed over to the position C, while the selector valve 183 is maintained in the position B. As a result, the hydraulic fluid from the inlet conduit 180 is supplied to the pressure control valve 182' having a larger set force $F_2$ of its spring 193' than the set force $F_1$, and the outlet pressure at the transition point is set at a predetermined intermediate level by the operation of the valve 182' in a similar manner. Further, when the controller 7 detects the weight rank $W_3$, the selector valve 183 is changed over to the position A. As a result, the hydraulic fluid from the inlet conduit 180 is supplied to the pressure control valve 182'' having a larger spring set force $F_3$ than the set force $F_2$, and the outlet pressure at the transition point is set at a predetermined high level by the operation of the valve 182'' in a similar manner.

Of course, this fixed pressure control valve assembly 52' operates in synchronous relation with the fixed pressure control valve assembly 50.

In the embodiment described above, the valve members 191, 191' and 191'' of the respective pressure control valves 182, 182' and 182'' have the same pressure-receiving surface area ratio, and the respective springs 193, 193' and 193'' have the different set forces $F_1$, $F_2$ and $F_3$, so that, while changing the transition point of the rear-wheel braking force, the rate of increase of the rear-wheel braking force is maintained constant after the transition point is reached. However, the individual pressure control valves 182, 182' and 182'' may have different pressure-receiving surface area ratios so as to change the rate of increase of the rear-wheel braking force after the transition point is reached. Such an arrangement may be more advantageous in some cases. Further, the springs 193, 193' and 193'' of the respective pressure control valves 182, 182' and 182'' may have the same set force, and the valve members 191, 191' and 191'' may have different pressure-receiving surface area ratios so as to change, at the same time, the transition point of the rear-wheel braking force and the rate of increase of the rear-wheel braking force after reaching of the transition point.

Also, in the embodiment above described, the three pressure control valves 182, 182' and 182'' are provided to deal with the classification of the vehicle weight into the three ranks. However, the number of the pressure control valves is optional, and the larger the number of them, the braking force distribution can be more closely controlled to meet the sensed vehicle weight.

Further, although the valve members 191, 191' and 191' of the respective pressure control valves 182, 182' and 182'' are adapted to respond to the internal pressures of the inlet and outlet pressure chambers in the aforementioned embodiment, they may be adapted to respond to the internal pressure of the outlet pressure chamber only. In such a case, the structure is such that the urging force due to the outlet pressure acting upon the pressure receiving areas of each of the valve members 191, 191' and 191'' balances with the urging force due to the force of each of the springs 193, 193' and 193'' thereby controlling the outlet pressure.

Figure 16:
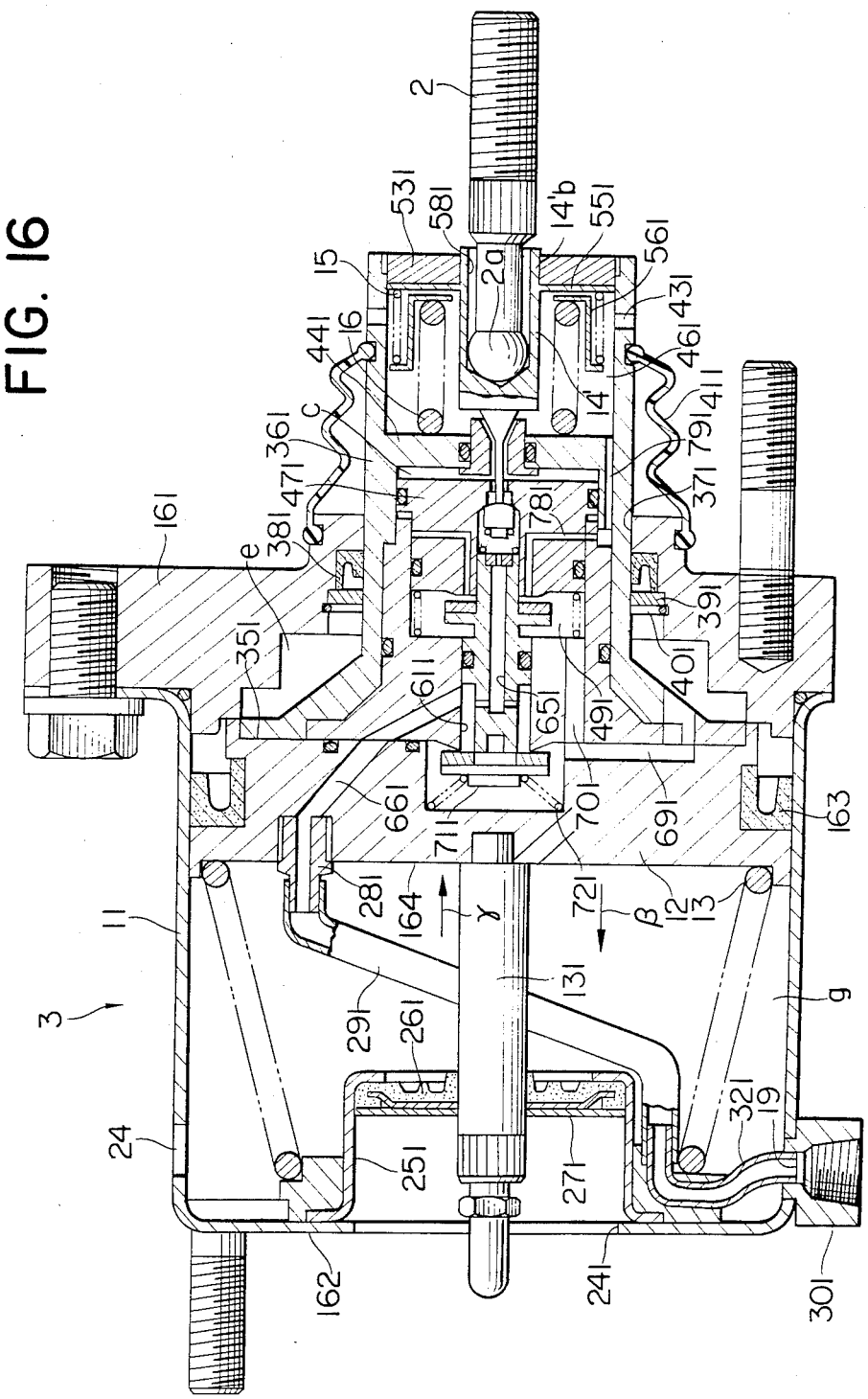
FIG. 16 is a sectional view of the booster unit in a fourth embodiment of the present invention.
Figure 17:
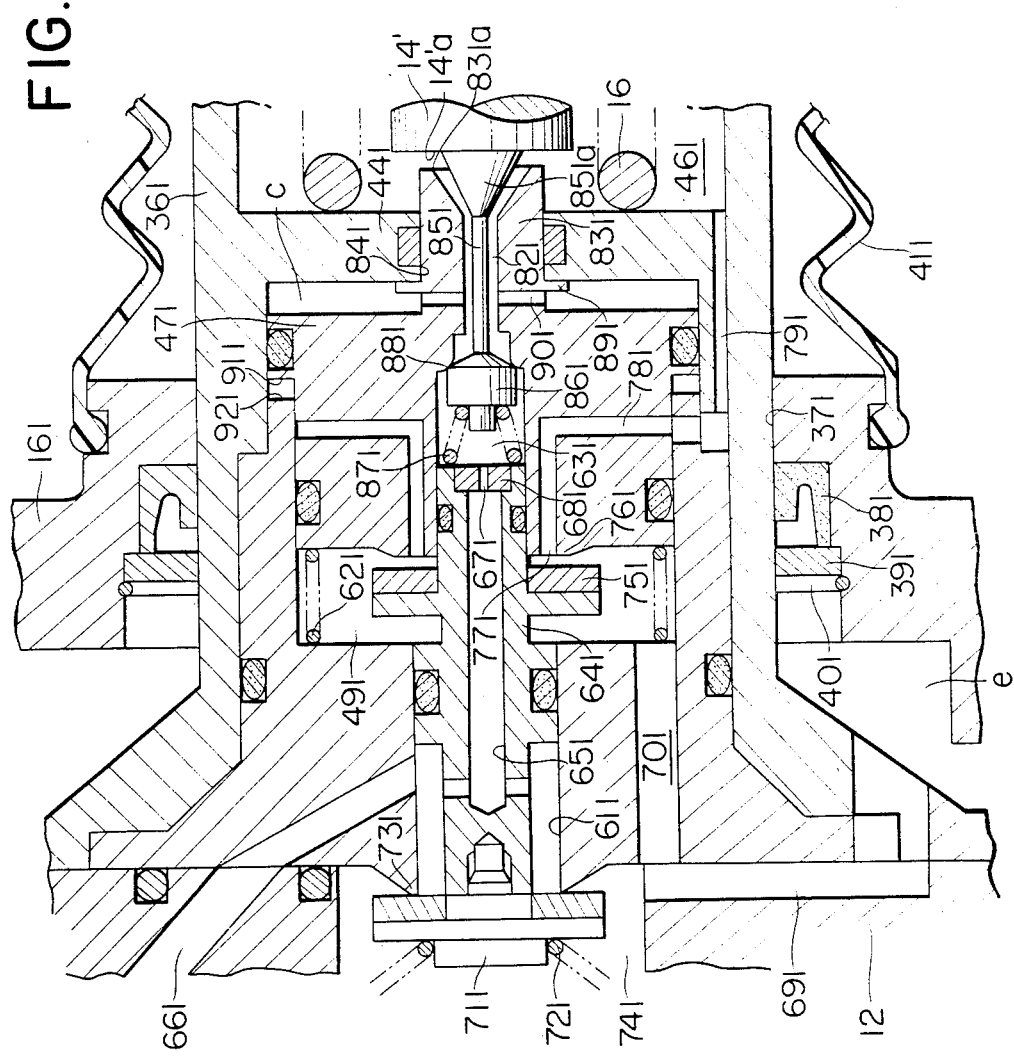
FIG. 17 is an enlarged view of part of FIG. 16.

A fourth embodiment of the present invention shown in FIGS. 16 and 17 includes a different form of the booster unit 3 included in the first embodiment, and, in FIGS. 16 and 17, the same reference numerals are used to designate equivalent parts appearing in FIG. 3.

Referring to FIGS. 16 and 17, the cylindrical housing 11 is bolted to a casing 161 of the booster unit 3. The power piston 12 is slidably disposed in the housing 11 to define the pressure chamber e and the atmospheric pressure chamber g in the housing 11. Compressed air introduced into the pressure chamber e causes advancing movement of the power piston 12 in a direction as shown by the arrow $\beta$ in FIG. 16. In the atmospheric pressure chamber g, the return spring 13 is interposed between one end 162 of the housing 11 and the power piston 12 to cause retracting movement of the power piston 12 in a direction as shown by the arrow Y in FIG. 16. Reference numerals 24 and 163 in FIG. 16 designate the discharge port and a coupling seal respectively.

As shown in FIG. 16, one end 2a of the push rod 2 is fixed to the end face 164 of the power piston 12 on the side of the atmospheric pressure chamber g. The push rod 2 which transmits the force of the power piston 12 making its advancing movement to the master cylinder 4 is operatively connected at its other end thereof to the piston of the master cylinder 4. A push-rod insertion opening 241 is formed in the end 162 of the housing 11, and a cylindrical seal holder 251 is mounted in this insertion opening 241. A seal 261 and a perforated plate 271 mounted in this seal holder 251 prevent intrusion of dust and other foreign matters into the atmospheric pressure chamber g.

A tube connector 281 is also mounted to the end face 164 of the power piston 12, and one end of a flexible tube 291 is connected to this connector 281. Another connector 301 is mounted on the outer peripheral surface of the housing 11, and its pressure inlet port 19 is connected to the air outlet of the variable pressure control valve 5. This pressure inlet port 19 is connected to the other end of the flexible tube 291 by a pipe 321.

A cylindrical valve body 361 is integrally mounted on the other end face 351 of the power piston 12 on the side of the pressure chamber e as shown in FIG. 16. This valve body 361 is slidably received in an insertion opening 371 of the casing 161, and a coupling seal 381, a bearing 391 and a retaining ring 401 are fitted on the inner peripheral surface of the insertion opening 371 to maintain gastight the interior of the pressure chamber e. The outer peripheral surface of the valve body 361 protruding to the exterior from the insertion opening 371 is covered with a boot 411 of rubber which prevents intrusion of dust and other foreign matters into the insertion opening 371.

A partition wall 441 is formed in the valve body 361 at a position substantially the middle thereof to define the pilot pressure chamber c and a spring accommodation chamber 461 on the left-hand and right-hand sides thereof respectively. A piston member 471, which is a movable member, is slidably disposed in the pilot pressure chamber c to further define a balance pressure chamber 491 in the pilot pressure chamber c. The spring accommodation chamber 461 communicates with the exterior through a communication port 431, and a regulator 14′, the first spring 16 and the second spring 15 are accommodated in this chamber 461. The regulator 14′ is slidably received at one end thereof 14′b in a receiving opening formed in an end plate 531, and the front end 2a of the actuating rod 2 connected at the rear end thereof to the brake pedal 1 is inserted in an insertion opening 581 formed in the regulator 14′. Further, the regulator 14′ is formed at a portion of its outer peripheral surface with an integral flange 551, and the first and second springs 16 and 15 are disposed in series through a spring retainer 561 between the flange 551 and the partition wall 441. These first and second springs 16 and 15 have greatly different moduli of elasticity. For example, the modulus of elasticity of the first spring 16 is about 75 kg/mm, and that of the second spring 15 is only about 0.01 kg/mm. The first and second springs 16 and 15 are imparted with a set force of, for example, about 7 kg so that, under the above condition, a slight gap is formed between the spring retainer 561 and the flange 551 of the regulator 14′. The end plate 531 is in screw threaded engagement at its outer peripheral surface with the corresponding portion of the inner peripheral surface of the valve body 361 so that the gap described above can be adjusted by rotation of the end plate 531 relative to the valve body 361.

The arrangement of the piston member 471 and associated parts will be described in further detail with reference to FIG. 17. Referring to FIG. 17, a return spring 621 is disposed in the balance pressure chamber 491, and the piston member 471 is normally biased rightward by the return spring 621. The piston member 471 is formed at its middle portion with a rod receiving cavity 631 into which one end of a valve actuating rod 641 is slidably received. The other end of this valve actuating rod 641 is slidably inserted into an insertion cavity 611. A communication passage 651 is formed in the valve actuating rod 641 to communicate at one end thereof with the tube connector 281 through the insertion cavity 611 and through a passage 661 formed in the power piston 12. A member 681 having a first orifice 671 is fixedly fitted in the other end of the communication passage 651.

An inlet valve member 711 is mounted on the other end of the valve actuating rod 641. This inlet valve member 711 is normally pressed against a valve seat 731 by a compression spring 721 so that compressed air in the passage 661 may not flow into a valve chamber 741. This valve chamber 741 communicates with the pressure chamber e and balance pressure chamber 491 through passages 691 and 701. On the other hand, an exit valve member 751 is mounted integrally on the rear end portion of the valve actuating rod 641. The piston member 471 is formed at one of its side faces with a valve seat 761 opposite to the exit valve member 751, and this exit valve member 751 is normally slightly spaced apart from the valve seat 761 as shown in FIG. 17. An exit port 771 is formed inside of the valve seat 761 to communicate with the spring accommodation chamber 461 through an exit passage 781 formed in the piston member 471 and through another exit passage 791 formed in the valve body 361.

A nozzle member 831 having a second orifice 821 communicating with the receiving cavity 631 is formed integrally with the end of the piston member 471 facing the pilot pressure chamber c. This nozzle member 831 is slidably inserted in an insertion opening 841 formed in the partition wall 441 to protrude at its right-hand end into the spring accommodation chamber 461. A stopper 891 is formed integrally with the other end of the nozzle member 831 and is normally pressed against the partition wall 441 by the return spring 621 as shown in FIG. 17. A communication passage 901 is formed on the other side of the stopper 891, and the second orifice 821 communicates at its upstream side (the left-hand side in FIG. 17) with the pilot pressure chamber c through this communication passage 901.

On the other hand, a needle 851 acting as a means for adjusting the opening of the second orifice 821 is formed as an extension of the front end 14′a of the regulator 14′ and extends into the second orifice 821. The needle 851 and the second orifice 821 cooperate to act as a flow restriction member. A check valve member 861 is mounted on the front end of the needle 851 extending into the receiving cavity 631. This check valve member 861 is normally pressed against a valve seat 881 by a compression spring 871 interposed between it and the valve actuating rod 641. The rear end portion 851a of the needle 851 is shaped in the form of a cone so that the opening of the second orifice 821 decreases progressively with the insertion of the needle 851 into the second orifice 821. As will be described in detail later, the internal pressure of the pilot pressure chamber c increases linearly in a relation proportional to the insertion stroke of the needle 851 relative to the second orifice 821.

The operation of the booster unit 3 having the above construction will now be described.

The pressure of compressed air accumulated in the accumulator 9 by the operation of the air pressure source 10 is reduced by the variable pressure control valve 5 to the level corresponding to the sensed weight of the vehicle, and compressed air at such a regulated pressure is always supplied to the pressure inlet port 19 of the booster unit 3. However, in the retracted position of the actuating rod 2, the inlet valve member 711 is in its closed position as seen in FIGS. 16 and 17. The piston member 471 is also in its retracted position, and the exit valve member 751 is in its open position. Therefore, the internal pressure of the pressure chamber e is equal to the atmospheric pressure, and the power piston 12 is maintained in the retracted position by the force of the return spring 1. Under such a situation, the check valve member 861 is kept in its closed position to prevent external leakage of compressed air through the second orifice 821.

Then, when the brake pedal 1 is depressed, the actuating rod 2 and the regulator 14' are advanced in the direction of the arrow β in FIG. 16. As a result, the check valve member 861 is first urged to its open position against the force of the compression spring 871, and the opening of the second orifice 821 is slightly decreased by the corresponding movement of the rear end portion 851a of the needle 851. Compressed air introduced into the pressure inlet port 19 flows out to the exterior by flowing through the pipe 321→flexible tube 291→passage 661→communication passage 651→first orifice 671→receiving cavity 631→second orifice 821→spring accommodation chamber 461→communication port 431 in the above order. Although, in this case, the pressure of compressed air having passed through the first orifice 671 slightly decreases, it is still slightly higher than the atmospheric pressure. Therefore, when compressed air at such a pressure is introduced into the pilot pressure chamber c through the communication passage 901, the piston member 471 is urged by the internal pressure of the pilot pressure chamber c to make its leftward advancing movement against the force of the return spring 621.

In response to the advancing movement of the piston member 471, the valve seat 761 engages with the exit valve member 751 to close the exit port 771, and the valve actuating rod 641 is urged leftward to make its advancing movement in that direction against the force of the compression spring 721. As a result, the inlet valve member 711 is urged to its open position, and compressed air in the passage 661 is supplied into the pressure chamber e after passing through the valve chamber 741 and passage 691 in the above order. The power piston 12 is urged by the internal pressure of the pressure chamber e to make its leftward advancing movement against the force of the return spring 13.

On the other hand, as soon as the power piston 12 starts its advancing movement, the flange 551 of the regulator 14' is brought into abutment with the spring retainer 561. The regulator 14' makes its leftward advancing movement against the force of the first spring 16. Therefore, the restoring force of the first spring 16 acts upon the regulator 14' as a reaction force, and this reaction force is transmitted via the actuating rod 2 to the brake pedal 1 to be sensed by the driver. Since the modulus of elasticity of the second spring 15 is very small (for example, only about 0.01 kg/mm as described already), the initial depression force to be imparted to the brake pedal 1 (the depression force for starting the advancing movement of the power piston 12) is very small so that the operation of the booster unit 3 can be started smoothly.

The relation between the depression force imparted to the brake pedal 1 and the output of the push rod 131 will now be described. As described hereinbefore, the internal pressure of the pilot pressure chamber c increases linearly in proportion to the insertion stroke of the needle 851 relative to the second orifice 821. Therefore, the internal pressure of the pilot pressure chamber c has a proportional relation to the force causing advancing movement of the actuating rod 2. In other words, the output of the push rod 131 has a proportional relation to the depression force imparted to the brake pedal 1. Suppose now that the power piston 12 ceases its advancing movement and is held in that position due to a balance reached between the force causing advancing movement of the power piston 12 and the reaction force of the piston of the master cylinder 4. Under such a condition, the piston member 471 does not move due to a balance reached between the force causing retracting movement of the piston member 471 by the combination of the internal pressure of the balance pressure chamber 491 and the force of the return spring 621 and the force causing advancing movement of the piston member 471 by the internal pressure of the pilot pressure chamber c. Under the condition in which the piston member 471 is held from movement, the inlet valve member 711 is in its closed position, and the exit valve member 751 is also in its closed position. Since, in this case, the internal pressure of the balance pressure chamber 491 is equal to the internal pressure of the pressure chamber e, the force causing advancing movement of the power piston 12 (the output of the push rod 131) is proportional to the depression force imparted to the brake pedal 1. Since, however, the brake pedal depression force is counteracted by the reaction force of the first spring 16, an increase in the pressure of compressed air introduced into the pressure chamber e does not change the brake pedal depression force.

After a balance between the force causing advancing movement of the power piston 12 and the reaction force of the piston of the master cylinder 4 is reached, the internal pressure of the balance pressure chamber 491 increases to cause slight retracting movement of the piston member 471. As a result, the inlet valve member 711 is urged to its closed position by the force of the compression spring 721 to stop the advancing movement of the power piston 12.

In the full-loaded operating condition of the booster unit 3, an abutting portion 911 of the piston member 471 is brought into engagement with an abutted portion 921 defined within the valve body 361, and the end 14'a of the regulator 14' is engaged by the end face 831a of the nozzle member 831. Thereafter, the brake pedal depression force is transmitted directly to the power piston 12 without being amplified or boosted. At this time, the inlet valve member 711 is brought to its open position, while the exit valve member 751 remains in its closed position.

Then, when the depression force having been imparted to the brake pedal 1 is released, the regulator 14' is retracted rightward by the force of the first spring 16, and the needle 851 is slightly moved out of the second orifice 821. As a result, the opening of the second orifice 821 increases to decrease the internal pressure of the pilot pressure chamber c. Because of this pressure drop, the piston member 471 is retracted rightward toward the illustrated position. The exit valve member 751 is urged to its open position, and compressed air in the pressure chamber e is discharged to the exterior by flowing through the discharge passages 691, 701, 781, 791, spring accommodation chamber 461 and communication port 431 in the above order. Therefore, the power piston 12 is retracted by the force of the return spring 13.

A fifth embodiment of the present invention will be described with reference to FIGS. 18 to 23.

Figure 18:
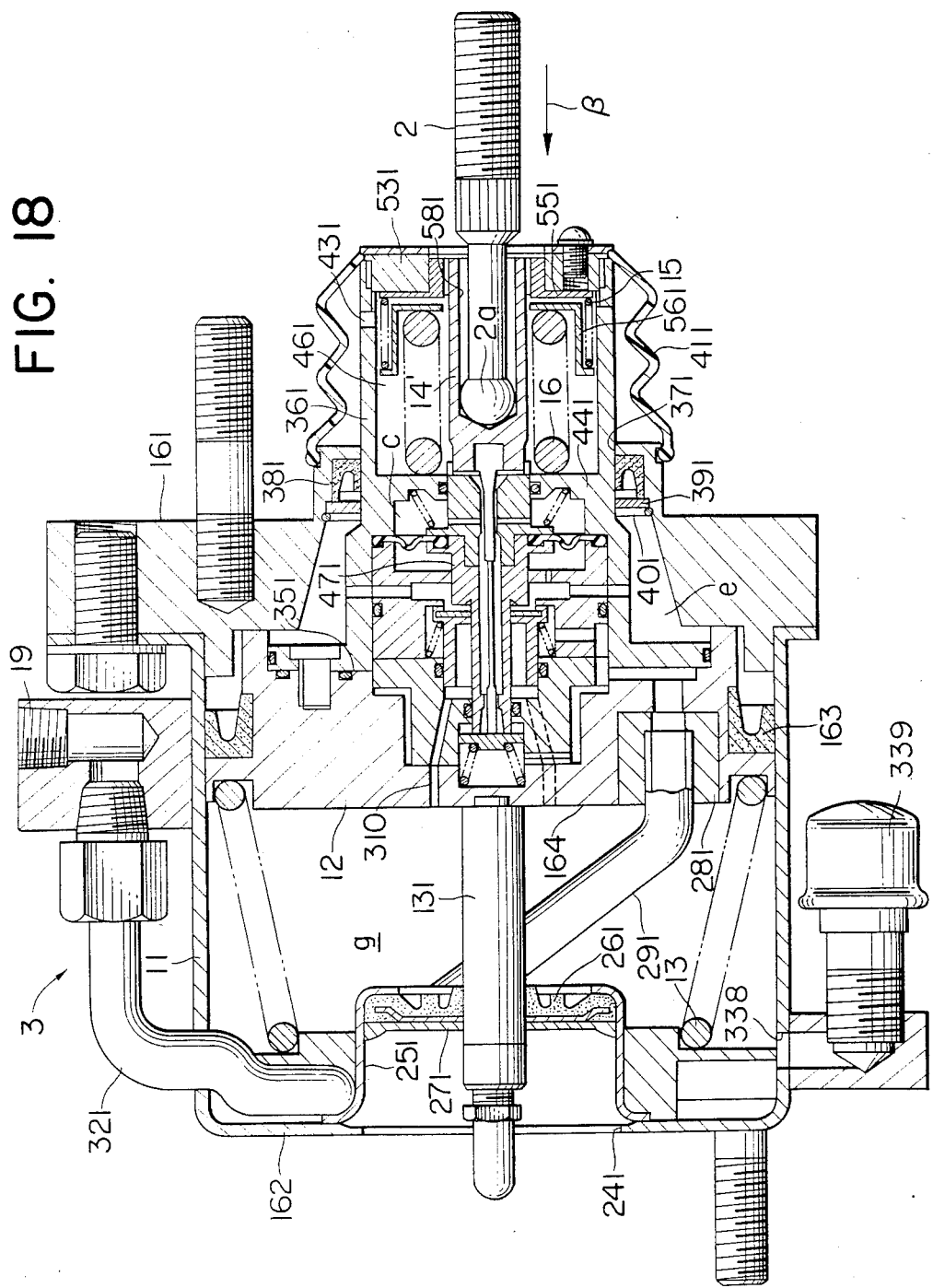
FIG. 18 is a sectional view of the booster unit in a fifth embodiment of the present invention.
Figure 19:
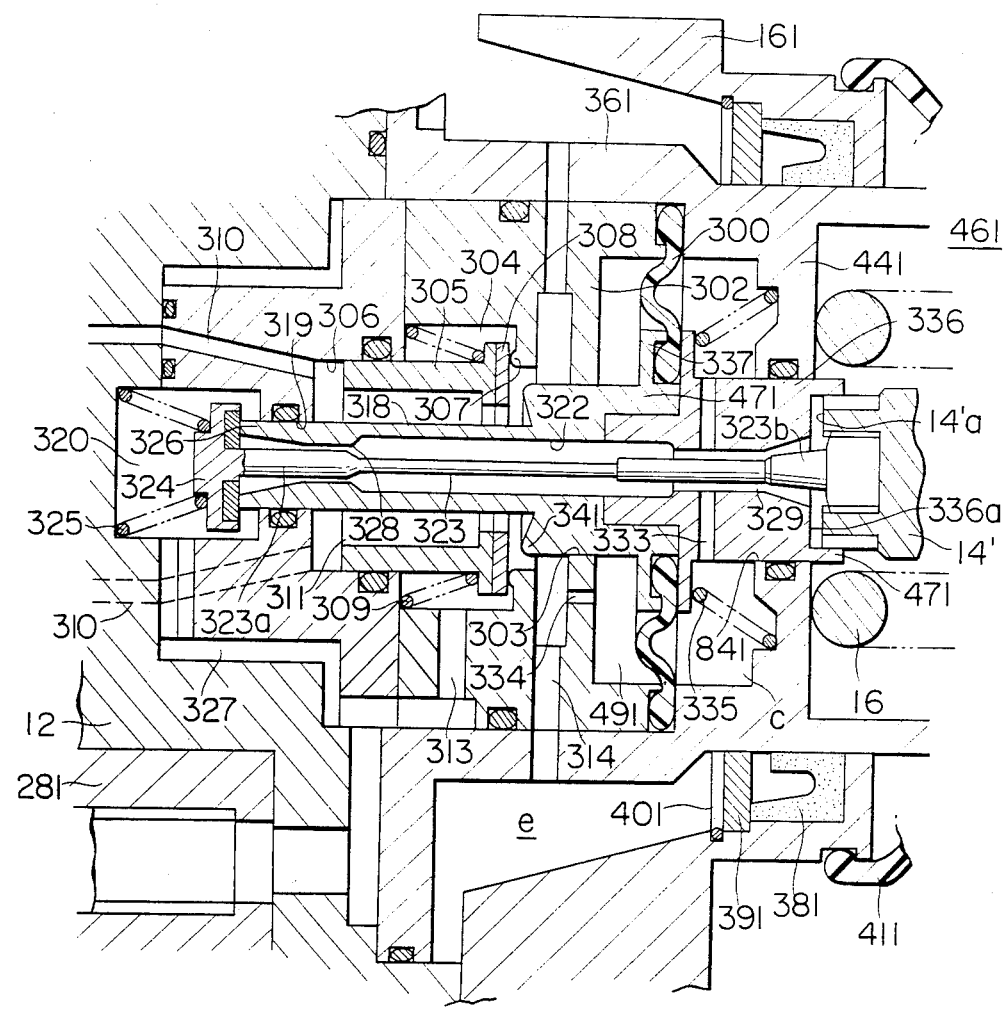
FIG. 19 is an enlarged view of part of FIG. 18.

This fifth embodiment differs somewhat from the fourth embodiment in the internal structure of the valve body 361 as shown in FIGS. 18 and 19. That is, the piston member 471 in the booster unit 3 is arranged to be driven by deformation of a diaphragm, and both of the first and second orifices 671 and 821 have variable openings. Further, during the retracting movement of the power piston 12, compressed air in the pressure chamber e is discharged into the atmospheric pressure chamber g. Since the remaining structure is substantially similar to that of the fourth embodiment, the same reference numerals are used to designate the same parts appearing in FIGS. 16 and 17 to dispense with detailed description thereof.

The arrangement of the piston member 471 and associated parts will be described in further detail. As shown in FIGS. 18 and 19, a partition wall 302 is formed between the balance pressure chamber 491 and the pressure chamber e defined by the piston member 471. The left-hand and right-hand ends of the piston member 471 are slidably inserted into insertion openings 303 and 841 formed in the partition walls 302 and 441 respectively. A diaphragm 300 is mounted on the outer periphery of the piston member 471 so that deformation of the diaphragm 300 caused by the internal pressure difference between the pilot pressure chamber c and the balance pressure chamber 491 causes sliding movement of the piston member 471 in either direction in FIGS. 18 and 19.

A valve chamber 304 is formed on the front side (the left-hand side in FIGS. 18 and 19) of the balance pressure chamber 491 to communicate with the flexible tube 291 through an inlet passage 313. The atmospheric pressure chamber g communicates with the pressure chamber e through a discharge passage 310, an inner cavity 311 of a cylindrical valve member 305 and a passage 314. The cylindrical valve member 305 is disposed in the valve chamber 304 and is slidably received at one end thereof in a receiving cavity 306. A valve seat 307 integral with the valve body 361 is formed outside of the valve member 305, and a seat portion 308 of the valve member 305 is normally pressed against the valve seat 307 by a compression spring 309, so that compressed air supplied through the passage 313 to an outer cavity 312 surrounding the valve body 305 may not interlude into the inner cavity 311 of the valve member 305 and also into the pressure chamber e.

A piston rod 318 integral with the piston member 471 extends into the inner cavity 311 of the valve member 305. The front end portion of this piston rod 318 is slidably inserted into an insertion cavity 319 to protrude thence into a valve chamber 320. A valve seat 341 is formed on the outer periphery of the other or rear end of the piston rod 318. When the piston member 471 makes its leftward advancing movement in FIG. 19, the valve seat 341 is pressed against the seat portion 308 of the valve member 305. Then, the valve member 305 is urged leftward against the force of the compression spring 309, and compressed air is introduced into the pressure chamber e through the gap between the valve seat 307 and the seat portion 308 of the valve member 305. When, on the other hand, the piston member 471 makes rightward retracting movement in FIG. 19, the seat portion 308 of the valve member 305 is pressed against the valve seat 307 by the compression spring 309 so that, thereafter, compressed air in the pressure chamber e is discharged to the exterior through the gap between the seat portion 308 of the valve member 305 and the valve seat 341. Thus, the valve member 305 has the dual function of an inlet valve member and an exit valve member.

An axial communication passage 322 extends through both of the piston member 471 and the piston rod 318. A needle 323 connected to the front end of the regulator 14' is inserted in this communication passage 322 and a check valve member 324 is mounted on the front end 323a of the needle 323. This check valve member 324 is normally pressed against a valve seat 326 formed at the front end of the piston rod 318 by a compression spring 325 as shown, but it is brought to its open position with the advancing movement of the actuating rod 2. Therefore, when the actuating rod 2 makes its advancing movement, compressed air introduced into the valve chamber 320 via a passage 327 flows out into the spring accommodation chamber 461 by flowing through the communication passage 322.

Figure 20:
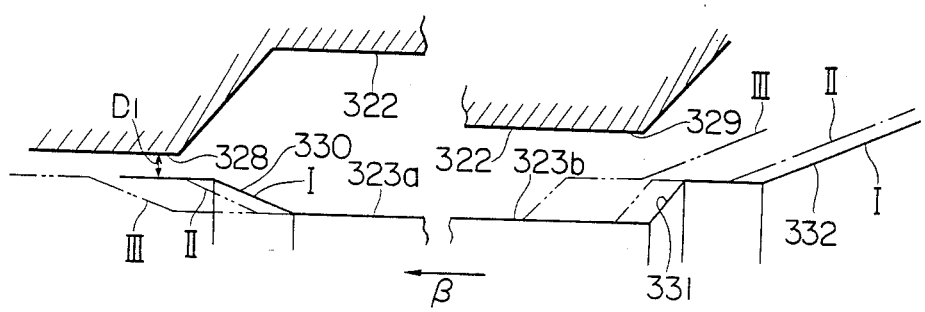
FIGS. 20 and 21 are enlarged views of part of FIG. 19 under different operating conditions.
Figure 21:
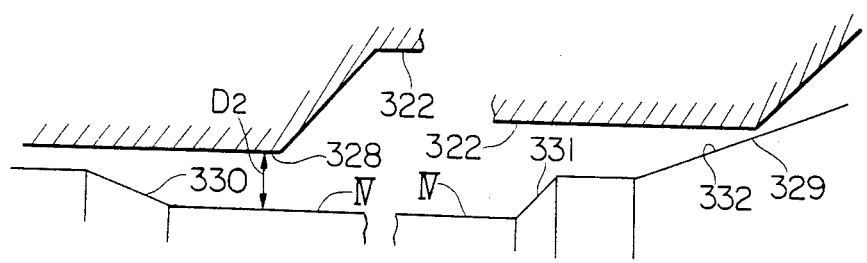

A first orifice 328 and a second orifice 329 are formed at the left-hand and right-hand ends respectively of the communication passage 322. The opening of these orifices 328 and 329 is adjustable by movement of the needle 323 in either direction. More precisely, as shown in FIGS. 20 and 21, a tapered portion 330 is formed on the outer peripheral surface at the front end 323a of the needle 323, and tapered portions 331 and 332 are formed on the outer peripheral surface at the other or rear end 323b of the needle 323, so that the gaps between the tapered portions 330, 331, 332 and the inner peripheral surfaces of the orifices 328 and 329 are variable depending on the direction of movement of the needle 323. The respective openings of the first and second orifices 328 and 329 are not changed at the same timing as will be described in detail later with reference to the operation of the booster unit 3.

The portion of the communication passage 322 between the first orifice 328 and the second orifice 329 communicates with the pilot pressure chamber c through a communication passage 333 as seen in FIG. 19. On the other hand, the balance pressure chamber 491 communicates with the pressure chamber e through a small port 334 bored in the partition wall 302. A compression spring 335 is disposed in the pilot pressure chamber c, and the diaphragm 300 is normally maintained in its non-deformed state by the balance between the force of the compression spring 335 and the force of the compression spring 325 associated with the check valve member 324.

The operation of the booster unit 3 having the above construction will now be described.

The pressure of compressed air accumulated in the accumulator 9 by the operation of the air pressure source 10 is reduced by the variable pressure control valve 5 to the level corresponding to the sensed weight of the vehicle, and compressed air at regulated pressure is supplied always to the pressure inlet port 19 of the booster unit 3. However, in the retracted position of the actuating rod 2, the check valve member 324 is in its closed position, and the seat portion 308 of the valve member 305 is pressed against the valve seat 307 by the force of the compression spring 309, as shown in FIGS. 18 and 19. The piston member 471 is also in its retracted position to leave a gap between the valve seat 341 and the seat portion 308 of the valve member 305. Therefore, the internal pressure of the pressure chamber e is equal to the atmospheric pressure, and the power piston 12 is maintained in the retracted position as shown in FIG. 18 by the force of the return spring 13.

Then, when the brake pedal 1 is depressed, the actuating rod 2 and the regulator 14' are advanced in the direction of the arrow β in FIG. 18. As a result, the check valve member 324 is first urged to its open position against the force of the compression spring 325. At the same time, the rear end 323b of the needle 323 is advanced in the direction of the arrow β from the position shown by the solid line I in FIG. 20 to the position shown by the one-dot chain line II, and the opening of the second orifice 329 is sharply decreased by the tapered portion 331 of the needle 323. Compressed air introduced into the pressure inlet port 19 flows out to the exterior by flowing through the pipe 321→flexible tube 291→passage 327→valve chamber 320→first orifice 328→communications passage 322→second orifice 329→spring accommodation chamber 461→communication port 431 in the above order. Although, in this case, the pressure of compressed air having passed through the first orifice 328 decreases slightly due to the flow restriction effect of the orifice 328, it is still slightly higher than the atmospheric pressure. Therefore, when compressed air at such a pressure is introduced into the pilot pressure chamber c through the communication passage 333, the diaphragm 300 is deformed by the internal pressure of the pilot pressure chamber c, and the piston member 471 is urged to make its leftward advancing movement in FIG. 19. By the use of the diaphragm 300, the sliding engagement area at the outer peripheral surface of the piston member 471 and the number of required O-rings can be decreased, so that the hysteresis characteristic and response characteristic of the piston member 471 can be improved owing to the reduced friction.

When the valve seat 341 formed on the piston rod 318 is pressed against the seat portion 308 of the valve member 305 as a result of the advancing movement of the piston member 471, the pressure chamber e is fully closed, and, immediately thereafter, the valve member 305 is urged leftward against the force of the compression spring 309. As a result, the valve seat 307 is spaced apart from the seat portion 308 of the valve member 305 to permit introduction of compressed air into the pressure chamber e through the gap between the valve seat 307 and the seat portion 308. The power piston 12 is urged by the internal pressure of the pressure chamber e to make its leftward advancing movement against the force of the return spring 13. Since the balance pressure chamber 491 communicates with the pressure chamber e through the small port 334, compressed air is gradually introduced into the balance pressure chamber 491. Therefore, the advancing movement of the piston member 471 is started smoothly.

On the other hand, as soon as the power piston 12 starts its advancing movement, the flange 551 of the regulator 14' is brought into engagement with the spring retainer 561. The regulator 14' makes its leftward advancing movement against the force of the first spring 16. Therefore, the restoring force of the first spring 16 acts upon the regulator 14' as a reaction force, and this reaction force is transmitted via the actuating rod 2 to the brake pedal 1 to be sensed by the driver.

Then, when the brake pedal 1 is further depressed to cause further advancing movement of the actuating rod 2, the opening of the first orifice 328 is increased by the tapered portion 330 of the front end 323a of the needle 323 as shown by the two-dot chain line III in FIG. 20. Since, at this time, there is utterly no change in the diameter of the rear end 323b of the needle 323 in the second orifice 329 as shown by the two-dot chain line III, the opening of the second orifice 329 remains unchanged or constant. As a result, the internal pressure of the communication passage 322 and pilot pressure chamber c increases quickly to quickly increase the speed of advancing movement of the piston member 471. Thus, the response characteristic of the booster unit 3 is improved.

Figure 22:
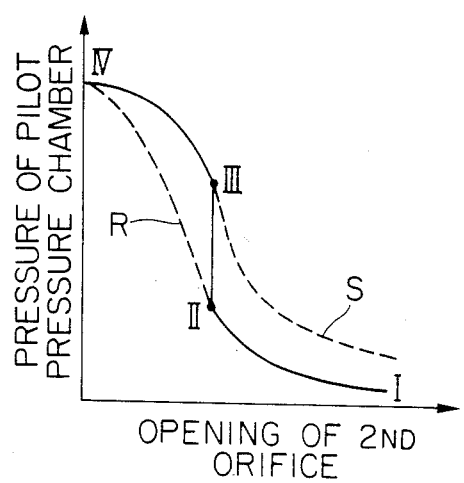
FIG. 22 is a graph showing the relation between the opening of the second orifice and the internal pressure of the pilot pressure chamber in the fifth embodiment.
Figure 23:
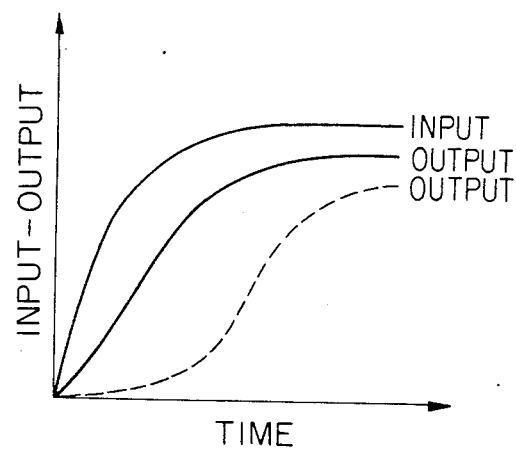
FIG. 23 is a graph showing the relation between the time and the input-output of the booster unit in the fifth embodiment.

FIGS. 22 and 23 are graphs showing the results of a test conducted to measure how the internal pressure of the pilot pressure chamber c increases relative to the opening of the second orifice 329 and to find how the response characteristic of the booster unit 3 according to the present invention is improved. The points I to IV on the solid curve shown in FIG. 22 correspond respectively to the positions I to IV of the needle 323 shown in FIGS. 20 and 21. For example, when the needle 323 is in the position shown by the solid line I in FIG. 20, the relation between the opening of the second orifice 329 and the internal pressure of the pilot pressure chamber c is represented by the point I in FIG. 22.

The broken curve R shown in FIG. 22 represents the relation between the opening of the second orifice 329 and the internal pressure of the pilot pressure chamber c when the opening of the first orifice 328 is constant and has a value $D_1$ as shown in FIG. 20, while the other broken curve S represents the same relation when the opening of the first orifice 328 is constant and has a value $D_2$ as shown in FIG. 21. It will be seen from the solid curve in FIG. 22 that the opening of the first orifice 328 is constant and very small between the points I and II, and, therefore, the quantity of compressed air consumed for increasing the pressure from the point I to the point II is very small. On the other hand, in FIG. 23 which is a graph showing how the input to and the output from the booster unit 3 increase relative to time, the broken curve represents how the output increases relative to time when the opening of the first orifice 328 is constant. It will be apparent from FIG. 23 that, by changing the opening of the first orifice 328, the output curve approaches the input curve thereby improving the response characteristic of the booster unit 3.

It is desirable that this improved response characteristic is especially exhibited in the case of so-called emergency braking. More precisely, it is desirable that the needle 323 is situated at the position shown by the two-dot chain line III in regions near the full-loaded operation points $W_1$, $W_2$ and $W_3$ in the Fb-Fp diagram shown in FIG. 7. In the present embodiment, the rear end 323b of the needle 323 is in screw threaded engagement with the regulator 14', and the flange 551 also makes screw threaded engagement with the regulator 14'. Therefore, by rotating the needle 323 or flange 551 relative to the regulator 14' to adjust the position thereof, the needle 323 can be easily set at the said desired position to deal with application of emergency braking.

Then, when the brake pedal 1 is further depressed, the front end 14'a of the regulator 14' is brought into engagement with the associated end face 336a of the nozzle member 336 of the piston member 471, and a flanged portion 337 of the piston member 471 is brought into engagement with the partition wall 302. Therefore, when the brake pedal is still further depressed in the above state, the depression force is now directly transmitted to the power piston 12 to place the booster unit 3 in its full-loaded operating condition. In this full-loaded operating condition, the needle 323 is advanced to the position shown by the solid line IV in FIG. 21, and the second orifice 329 is nearly full closed by the tapered portion 332 of the needle 323. Therefore, the quantity of compressed air flowing outside from the second orifice 329 can be minimized.

After a balance between the force causing the advancing movement of the power piston 12 and the reaction force of the piston of the master cylinder 4 is reached, the internal pressure of the balance pressure chamber 491 increases to cause slight retracting movement of the piston member 471. As a result, the seat portion 308 of the valve member 305 is brought into pressure engagement with the two valve seats 307 and 341 at the same time, and introduction of compressed air into the pressure chamber e ceases to stop the advancing movement of the power piston 12.

Then, when the depression force having been imparted to the brake pedal 1 is released, the regulator 14' is retracted rightward by the force of the first spring 16, and the needle 323 is slightly moved out of the communication passage 322. As a result, the opening of the first orifice 328 decreases, and the opening of the second orifice 329 increases to decrease the internal pressure of the pilot pressure chamber c. Because of this pressure drop, the piston member 471 is retracted rightward. The seat portion 308 of the valve member 305 is brought into pressure engagement with the valve seat 307 by the force of the compression spring 309, and the valve seat 341 of the piston member 471 is moved away from the seat portion 308 of the valve member 305. Compressed air in the pressure chamber e is discharged to the exterior by flowing through the passage 314→inner cavity 311 of the valve member 305→discharge passage 310→atmospheric pressure chamber g→communication port 338→filter unit 339 in the above order. Consequently, the piston member 471 is retracted to the position shown in FIG. 18 by the force of the return spring 13.

Figure 24:
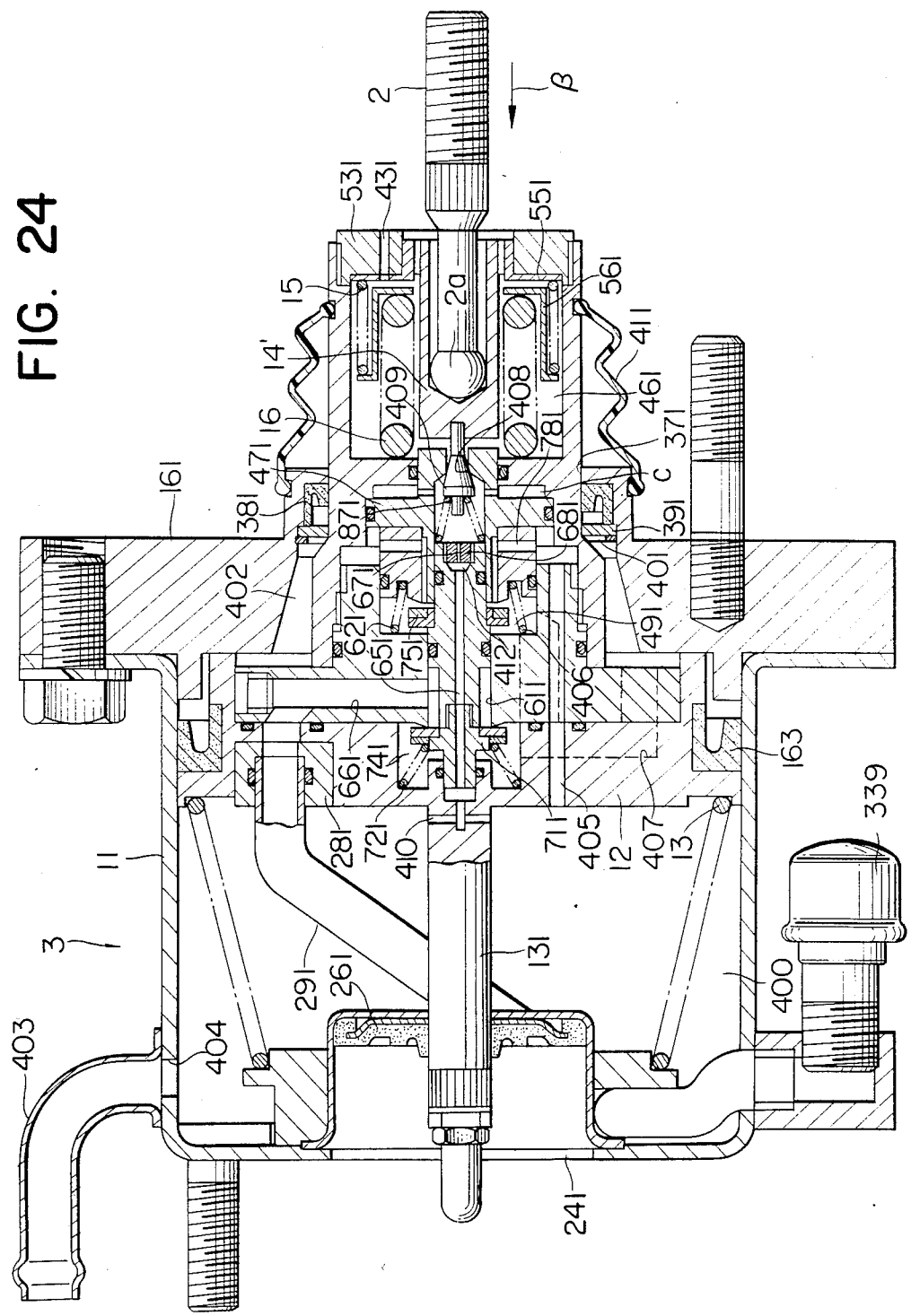
FIG. 24 is a sectional view of the booster unit in a sixth embodiment of the present invention.

In a sixth embodiment of the present invention shown in FIG. 24, the booster unit 3 in the fourth embodiment is modified to operate on a negative pressure or vacuum.

Referring to FIG. 24, a pressure chamber 400 and an atmospheric pressure chamber 402 are formed on the left-hand and right-hand sides respectively of the power piston 12. A negative pressure or vacuum is introduced into the pressure chamber 400 by way of a pipe 403 and a pressure inlet port 404. This vacuum is normally introduced into the atmospheric pressure chamber 402 by the route including a discharge passage 405 of the power piston 12, the balance pressure chamber 491, a discharge spring 406, a valve chamber 741 and a passage 407. On the other hand, the atmospheric pressure is introduced into a passage 661 of the power piston 12 through the filter unit 339 and flexible tube 291, so that, whan the actuating rod 2 makes its advancing movement in the direction of the arrow β to urge the inlet valve member 711 to its open position, this atmospheric pressure is introduced into the atmospheric pressure chamber 402 through the valve chamber 741 and passage 407. The opening of a first orifice 408 is adjustable by a needle 409. In response to the advancing movement of the actuating rod 2 in the direction of the arrow β, air charged into the spring accommodation chamber 461 through the communication port 431 is drawn into the pressure chamber 400 by the route including the first orifice 408, a second orifice 412, a communication passage 651 and a passage 410.

Figure 25:
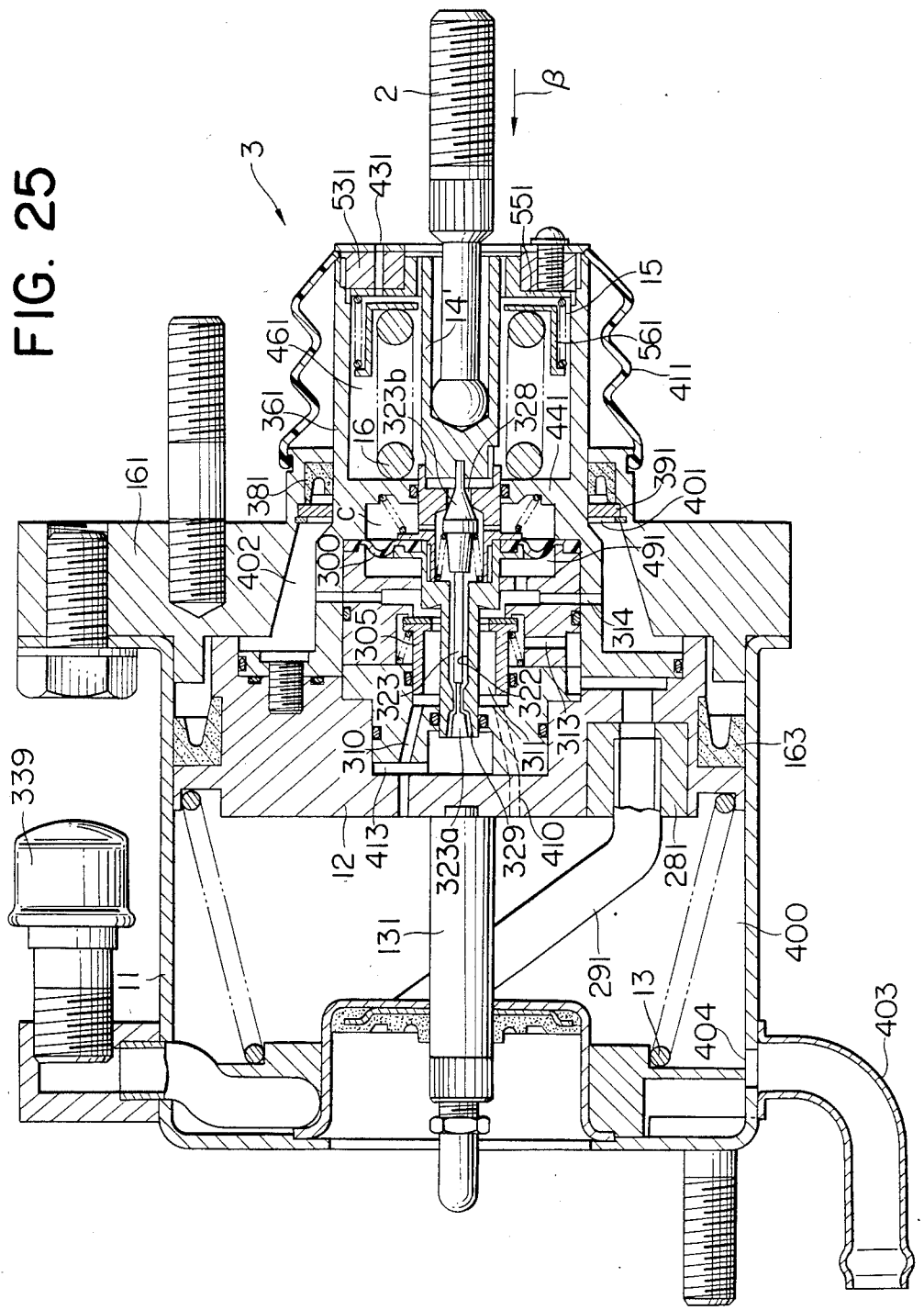
FIG. 25 is a sectional view of the booster unit in a seventh embodiment of the present invention.

In a seventh embodiment of the present invention shown in FIG. 25, the booster unit 3 in the fifth embodiment is modified to operate on a negative pressure or vacuum. and an atmospheric pressure chamber 402 similar to those shown in FIG. 24 are formed on the left-hand and right-hand sides respectively of the power piston 12. A negative pressure or vacuum is introduced into the pressure chamber 400 by way of a pipe 403 and a pressure inlet port 404. This vacuum is normally introduced into the atmospheric pressure chamber 402 by the route including the discharge passage 310 of the power piston 12, the inner cavity 311 of the valve member 305 and the passage 314. On the other hand, the atmospheric pressure is introduced into the inlet passage 313 of the power piston 12 through the filter unit 339 and flexible tube 291 so that, when the actuating rod 2 makes its advancing movement in the direction of the arrow β, the atmospheric pressure is introduced into the atmospheric pressure chamber 402. The opening of the first and second orifices 328 and 329 is adjustable by the front and rear ends 323a and 323b of the needle 323 respectively. In response to the advancing movement of the actuating rod 2 in the direction of the arrow β, air charged into the spring accommodation chamber 461 through the communication port 431 is drawn into the pressure chamber 400 by the route including the first orifice 328, communication passage 322, second orifice 329, passage 413 and discharge passage 410.

Although compressed air at the pressure corresponding to the sensed weight of the vehicle is introduced into the pressure chamber e in the aforementioned embodiments of the present invention, compressed air at a pressure corresponding to, for example, the physical strength of the driver may be introduced into the pressure chamber e.

Figure 26:
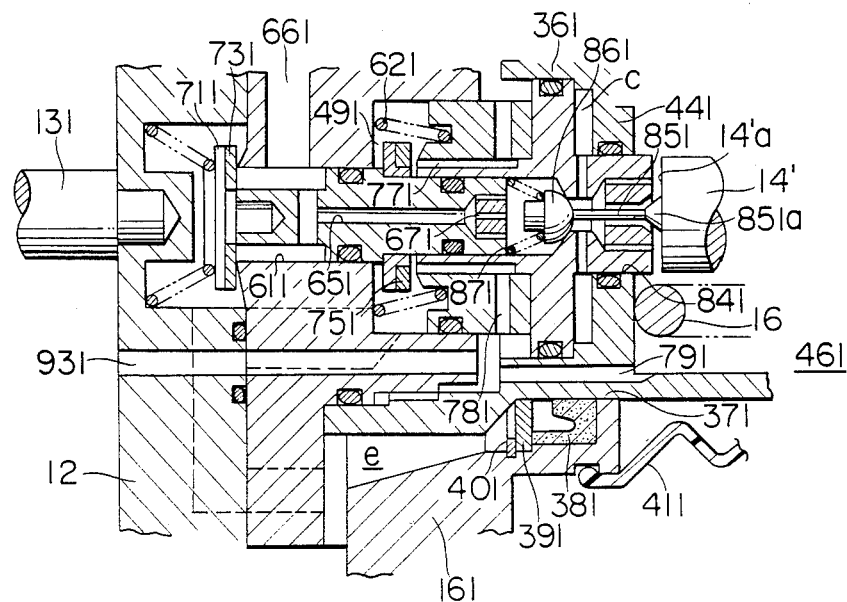
FIG. 26 is a sectional view of a modification of the booster unit in the fourth embodiment shown in FIG. 16.

Further, although compressed air in the pressure chamber e is discharged into the spring accommodation chamber 461 through the discharge passage 791 in the fourth embodiment, it may be discharged into the atmospheric pressure chamber g through a discharge passage 931 as shown in FIG. 26 in order to reduce the discharge noise.

Figure 27:
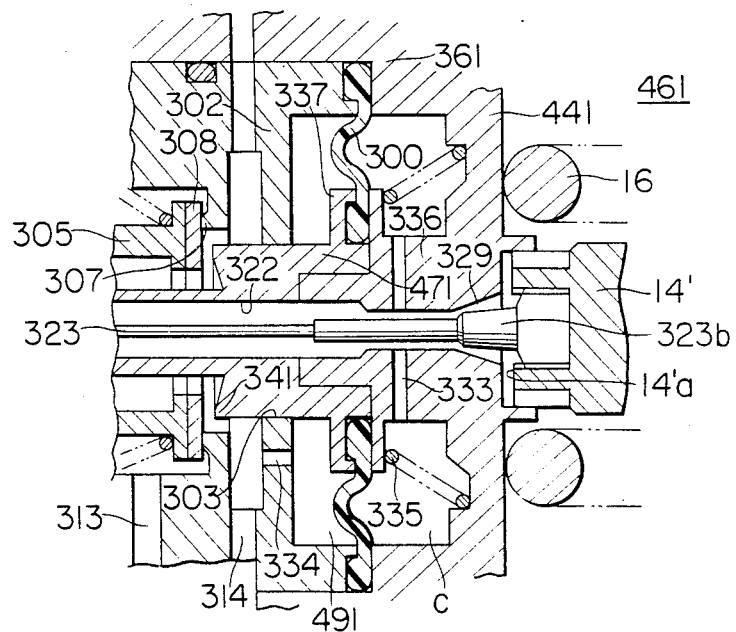
FIG. 27 is a sectional view of a modification of the booster unit in the fifth embodiment shown in FIG. 18.

Further, although the nozzle member 336 is formed in integral relation with the piston member 471 in the fifth embodiment, it may be formed in integral relation with the partition wall 441 as shown in FIG. 27 in order to shorten the stroke of advancing movement of the actuating rod 2. That is, when the nozzle member 336 is formed in integral relation with the piston member 471, the actuating rod 2 must be advanced over an excessively long stroke which is the sum of the stroke of advancing movement of the power piston 12 and the additional stroke of advancing movement of the piston member 471, in order to decrease the opening of the second orifice 329. However, when the nozzle member 336 is formed in integral relation with the partition wall 441, the advancing movement of the actuating rod 2 is limited to a shortened stroke corresponding only to the stroke of advancing movement of the power piston 12, and the response characteristic of the booster unit 3 can be correspondingly improved.

Furthermore, although the opening of the second orifice 821 is adjusted to control the internal pressure of the pilot pressure chamber c in the fourth embodiment, the opening of the first orifice 671 may be adjusted to control the internal pressure of the pilot pressure chamber c.

FIGS. 28 to 31 show an eighth embodiment of the present invention which includes a different form of the booster unit 3 included in the fourth embodiment, and the internal structure of the valve body 361 in the booster unit 3 in the eighth embodiment differs from that in the fourth embodiment.

Figure 28:
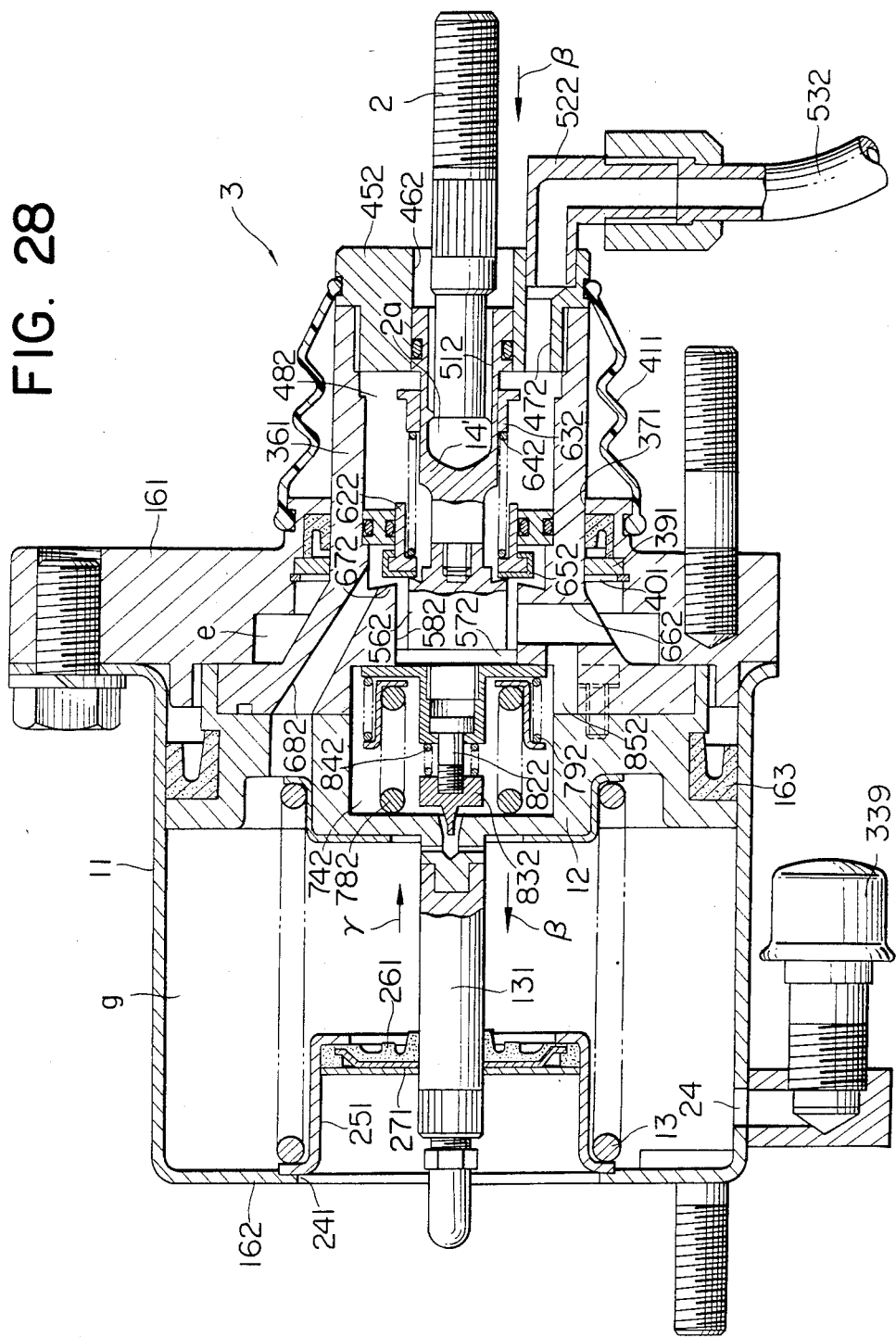
FIG. 28 is a sectional view of the booster unit in an eighth embodiment of the present invention.

Referring to FIGS. 28 and 29, an end plate 452 covering the end of the valve body 361 is formed with a receiving opening 462 and an inlet port 472, and one end of the regulator 14' disposed in a valve chamber 482 of the valve body 361 is slidably received in the receiving opening 462. The front end 2a of the actuating rod 2 operatively connected to the brake pedal 1 is inserted into an insertion opening 512 of the regulator 14'. The inlet port 472 is connected to the air outlet of the variable pressure control valve 5 by a pipe 522 and a tube 532 so that compressed air can always be introduced into the valve chamber 482 of the valve body 361.

The front end of the regulator 14' is operatively connected to a connecting rod 562. A flanged portion 572 of the connecting rod 562 is slidably received in a receiving cavity 582, and a valve seat 592 is formed on an outer peripheral portion of the connecting rod 562. A ring 612 is securely fitted in the valve chamber 482 to engage the inner peripheral surface 602 of the valve chamber 482, and a cylindrical valve member 622 is slidably fitted in the ring 612. A compression spring 642 is disposed between the valve member 622 and a spring retainer 632 fixed to the regulator 14'. Therefore, a seat portion 652 of the valve member 622 is normally pressed against a valve seat 592 of the connecting rod 562 by the compression spring 642 so that compressed air in the valve chamber 482 may not flow into the pressure chamber e by way of the receiving cavity 582 and a passage 662. As best shown in FIG. 31, a stepped portion 702 including a tapered portion 692 is formed inside of the valve seat 592 so as to define a first orifice 712 between this stepped portion 702 and the inner periphery of the valve member 622. Therefore, the opening of this first orifice 712 changes with reciprocating movement of the connecting rod 562.

A valve seat 672 is formed at the edge portion of the receiving cavity 582. The portion of the cavity 582 outside of this valve seat 672 communicates with the atmospheric pressure chamber g through a discharge passage 682 to normally permit introduction of the atmospheric pressure into the pressure chamber e. However, when the regulator 14' and connecting rod 562 make leftward advancing movement in FIG. 29, the seat portion 652 of the valve member 622 is pressed against the valve seat 672 by the force of the compression spring 642, and the valve seat 592 of the connecting rod 562 moves away from the seat portion 652 of the valve member 622 to permit introduction of compressed air from the valve chamber 482 into the pressure chamber e.

The front end 562a of the connecting rod 562 is connected to a spring retainer 752 disposed in a spring accommodation chamber 742. This spring retainer 752 is formed with a flange 762 at its outer peripheral portion, and a first spring 782 and a second spring 792 are disposed in series between the flange 762 of the spring retainer 752 and the inner wall 772 of the spring accommodation chamber 742, with a coupling ring 802 interposed therebetween. These first and second springs 782 and 792 have greatly different moduli of elasticity as in the case of the springs 16 and 15 in the fourth embodiment. Further, the first and second springs 782 and 792 are given a predetermined set force such that a slight gap is normally defined between the coupling ring 802 and the flange 762 of the spring retainer 752. The spring retainer 752 is in screw threaded engagement with the front end 562a of the connecting rod 562 so that the above gap can be suitably adjusted by rotation of the spring retainer 752 relative to the rod 562.

A receiving cavity 812 is formed in the spring retainer 752, and the rear end 822a of a supporting rod 822 is slidably received in this receiving cavity 812. An adjusting member 832 is in screw threaded engagement with the front end of the supporting rod 822. A compression spring 842 is disposed between the spring retainer 752 and the adjusting member 832. On the other hand, the spring accommodation chamber 742 communicates with the presure chamber e through a passage 852 and communicates also with the atmospheric pressure chamber g through a second orifice 862 formed in the inner wall 772 of the spring accommodation chamber 742 and through a passage 872.

A needle 882 which is a portion of the adjusting member 832 extends into the second orifice 862. As best shown in FIG. 30, tapered portions 892 and 902 are formed on the outer periphery of this needle 882 so that the opening of the second orifice 862 changes depending on the insertion stroke of the needle 882 relative to the second orifice 862. The inclination of the tapered portion 892 of the connecting rod 562 and those of the tapered portions 892 and 902 of the needle 882 are so determined that the internal pressure of the pressure chamber e increases linearly in proportional relation to the stroke of advancing movement of the actuating rod 2, as will be apparent from the following description of operation.

The operation of the booster unit 3 having the above construction will now be described.

Compressed air whose pressure is reduced to the level corresponding to the sensed weight of the vehicle by the variable pressure control valve 5 is continuously supplied to the pressure inlet port 472 of the booster unit 3. However, when the actuating rod 2 is in its retracted position, the seat portion 652 of the valve member 622 is pressed by the force of the compression spring 642 against the valve seat 592 of the connecting rod 562. On the other hand, the seat portion 652 of the valve member 622 is not in seating engagement with the valve seat 672. Therefore, the internal pressure of the pressure chamber e is equal to the atmospheric pressure, and the power piston 12 is in the position retracted by the force of the return spring 13.

Then, when the brake pedal 1 is depressed, the actuating rod 2 and regulator 14' make advancing movement in the direction of the arrow $\beta$ in FIG. 28. As a result, the seat portion 652 of the valve member 622 is pressed against the valve seat 672 by the force of the compression spring 642, and, immediately thereafter, the valve seat 592 of the connecting rod 562 moves away from the seat portion 652. Compressed air in the valve chamber 482 is introduced into the pressure chamber e through the first orifice 712, receiving cavity 582 and passage 662, and the power piston 12 urged by the internal pressure of the pressure chamber e makes leftward advancing movement against the force of the return spring 13. At this time, the needle 882 is advanced in the direction of the arrow β to the position shown by the one-dot chain line II from the position shown by the solid line I in FIG. 30, with the result that the opening of the second orifice 862 is abruptly decreased by the tapered portion 892 of the needle 882. Therefore, the quantity of compressed air flowing out through the second orifice 862 into the atmospheric pressure chamber g is very small.

As soon as the power piston 12 starts its advancing movement, the flange 762 of the spring retainer 752 is engaged by the coupling ring 802, and the spring retainer 752 makes leftward advancing movement against the force of the first spring 782. Therefore, the restoring force of the first spring 782 acts upon the spring retainer 752 as a reaction force, and this reaction force is transmitted through the connecting rod 562 and regulator 14' to the actuating rod 2, thence to the brake pedal 1 to be sensed by the driver. Since the modulus of elasticity of the second spring 792 is very small, the initial depression force to be imparted to the brake pedal 1 (the depression force for starting the advancing movement of the power piston 12) is very small so that the operation of the booster unit 3 can be started smoothly.

Then, when the brake pedal 1 is further depressed to cause advancing movement of the actuating rod 2, the opening of the first orifice 712 is increased by the tapered portion 692 as shown by the two-dot chain line III in FIG. 31. Since, at this time, there is utterly no change in the diameter of the needle 882 in the second orifice 862 as shown by the two-dot chain line III in FIG. 30, the opening of the second orifice 862 remains unchanged or constant. As a result, the internal pressure of the pressure chamber e increases quickly to quickly increase the speed of advancing movement of the power piston 12. Thus, the response characteristic of the booster unit 3 is improved. Since the opening of the first orifice 712 is constant and very small between the positions I and II, the quantity of compressed air consumed during the pressure increase from the position I to the position II is very small. Since the adjusting member 832 is in screw threaded engagement with the supporting rod 822, and, since the connecting rod 562 is also in screw threaded engagement with the regulator 14', the needle 882 and the connecting rod 562 can be easily positioned at the aforementioned desired positions to deal with emergency braking by suitably rotating the adjusting member 832 or connecting rod 562 relative to the supporting rod 822 or regulator 14'.

Then, when the brake pedal 1 is further depressed, the side face 912 of the adjusting member 832 is engaged by the inner wall 772 of the spring accommodation chamber 742 thereby full closing the second orifice 862. Therefore, the internal pressure of the pressure chamber e increases to its maximum, and, when the brake pedal 1 is still further depressed in the above state, the depression force is now directly transmitted to the power piston 12 through the first spring 782 to place the booster unit 3 in its full-loaded operating condition.

After a balance between the force causing the advancing movement of the power piston 12 and the reaction force of the piston of the master cylinder 4 is reached, the quantity of air flowing into the pressure chamber e through the first orifice 712 is equal to the quantity of air flowing into the atmospheric pressure chamber g through the second orifice 862, and the internal pressure of the pressure chamber e is maintained unchanged or constant thereby ceasing the advancing movement of the power piston 12.

Then, when the depression force having been imparted to the brake pedal 1 is released, the connecting rod 562 is retracted rightward by the force of the first spring 782 thereby pressing the valve seat 592 against the seat portion 652 of the valve member 622 and moving the seat portion 652 away from the valve seat 672. As a result, compressed air ceases to flow into the pressure chamber e, and compressed air in the pressure chamber e is discharged to the exterior by flowing through the passage 622→receiving cavity 582→discharge passage 682→atmospheric pressure chamber g→communication port 24→filter unit 339→in the above order. Therefore, the power piston 12 is retracted to the illustrated position by the force of the return spring 13.

Figure 32:
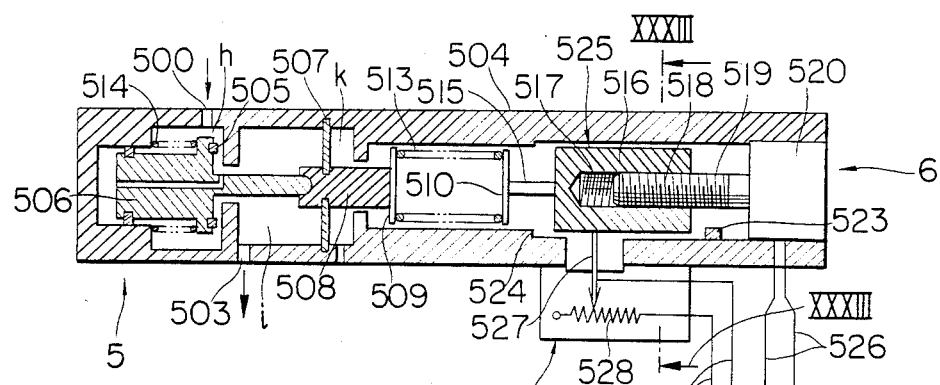
FIG. 32 is a sectional view of a ninth embodiment of the present invention.
Figure 33:
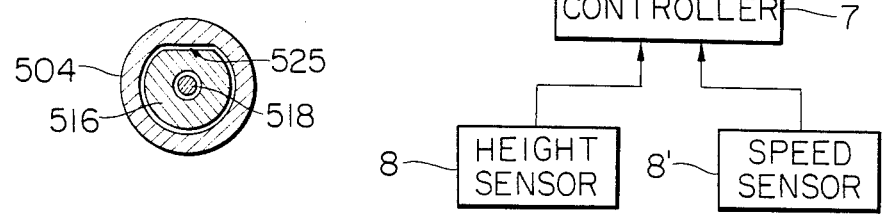
FIG. 33 is a sectional view taken along the line XXXIII—XXXIII in FIG. 32.

A ninth embodiment of the present invention shown in FIGS. 32 and 33 includes modifications of the variable pressure control valve 5 and drive unit 6 included in the first embodiment, and the same reference numerals are used in FIGS. 32 and 33 to designate equivalent parts shown in FIG. 4.

Referring to FIGS. 32 and 33, the modified variable pressure control valve 5 includes a valve body 504 having an inlet port 500 connected to the air pressure source 10 and an outlet port 503 connected to the booster unit 3, a valve piston 506 disposed slidably in the valve body 504 and provided with an annular seal 505 for controlling communication between an inlet pressure chamber h and an outlet pressure chamber i, a diaphragm 507 fixed at its outer periphery to the inner wall of the valve body 504 for separating the outlet pressure chamber i from an atmospheric pressure chamber k opened to the atmosphere, a shaft 508 extending through the diaphragm 507 to disengageably engage an extension of the valve piston 506, a control compression spring 513 supported at one end thereof by the shaft 508 through a spring seat 509 and at the other end thereof by another spring seat 510 for normally maintaining the piston 506 in its open position, and a weak spring 514 for biasing the piston 506 toward its closed position. The drive unit 6 includes a slider 516 having a push rod 515 engaging at its left-hand end with the spring seat 510 and disposed slidably in the valve body 504 in coaxial relation with the piston 506, and an electrical step motor 520 mounted integrally with or separately from the valve body 504 and having a rotary shaft 518 making screw threaded engagement at its threaded front end portion 519 with a threaded hole 517 bored in the slider 516. A projection 523 is provided on the inner wall of the valve body 504 to act as a stopper for limiting rightward movement of the slider 516, and a shoulder 524 is also formed in the valve body 504 to act as a stopper for limiting leftward movement of the slider 516. A flat guide portion 525 of the valve body 504 cooperates with a mating portion of the slider 516 to prevent rotation of the slider 516 relative to the valve body 504.

A vehicle height sensor (a vehicle weight sensor) 8 is mounted between the vehicle body and the rear axle to sense the displacement of the vehicle body relative to the rear axle, which displacement is proportional to the weight or load of the vehicle. A vehicle speed sensor 8' senses the speed of the vehicle. The output signals from these sensors 8 and 8' are applied to the controller 7. The controller 7 computes the vehicle weight on the basis of the vehicle weight signal only applied in the standstill condition of the vehicle, that is, when the vehicle speed is zero. In order that compressed air at the pressure corresponding to the sensed vehicle weight can be supplied to the booster unit 3 on the basis of pre-set characteristic data, the controller 7 applies a drive signal to the drive unit 6 by way of an output line 526 for causing rotation of the step motor 520 in the normal or reverse direction. At the lower part of the valve body 504, an arm 527 fixed at one end to the lower part of the slider 516 extends to the exterior through an elongated slot of the valve body 504 to cooperate with a resistor 528 to constitute a potentiometer type of displacement sensor 529. This displacement sensor 529 senses directly the actual displacement of the slider 516 relative to the rotary shaft 518 and feeds back its output signal to the controller 7 by way of a feedback line 530.

In operation of the variable pressure control valve 5, compressed air supplied from the air pressure source 10 to the pressure inlet port 500 is introduced from the inlet pressure chamber h into the outlet pressure chamber i by flowing through the gap around the valve piston 506. When the internal pressure of the output pressure chamber i exceeds a certain level, the diaphragm 507 and shaft 508 are urged rightward against the force of the spring 513, and the valve piston 506 urged by the spring 514 moves rightward thereby interrupting communication between the two pressure chambers h and i. Then, when the internal pressure of the outlet pressure chamber i drops to lower than the above level, the diaphragm 507, shaft 508 and piston 506 are urged leftward by the force of the spring 513 to re-establish communication between the outlet pressure chamber i and the inlet pressure chamber h.

Suppose now that the drive signal applied to the drive unit 6 from the controller 7 in response to an increased vehicle weight causes, for example, rotation of the step motor 520 in the normal direction. Then, the rotary shaft 518 rotates in one direction to cause leftward movement of the slider 516 thereby increasing the set force of the spring 513, hence, raising the critical pressure level causing interruption of communication between the two pressure chambers h and i. Suppose, on the contrary, that the step motor 520 is rotated in the reverse direction in response to a decreased vehicle weight. Then, the rotary shaft 518 rotates in the other direction to cause rightward movement of the slider 516 thereby decreasing the set force of the spring 513, hence, lowering the above pressure level.

The displacement of the slider 516 in relation to the desired set force of the spring 513 is previously determined by the controller 7 so that, as soon as the actual displacement of the slider 516 sensed by the displacement sensor 529 attains the predetermined setting, the drive signal from the controller 7 disappears to stop the rotation of the step motor 520.

In this manner, the valve piston 506 is maintained in the position at which the variable set force of the spring 513 is balanced by the internal pressure of the outlet pressure chamber i acting upon the diaphragm 507. Consequently, the maximum actuating pressure of compressed air supplied to the booster unit 3 is controlled depending on the sensed vehicle weight thereby correspondingly changing the boosting rate so that a fixed depression force imparted to the brake pedal 1 can brake the vehicle at a fixed deceleration regardless of any change in the vehicle weight.

Figure 34:
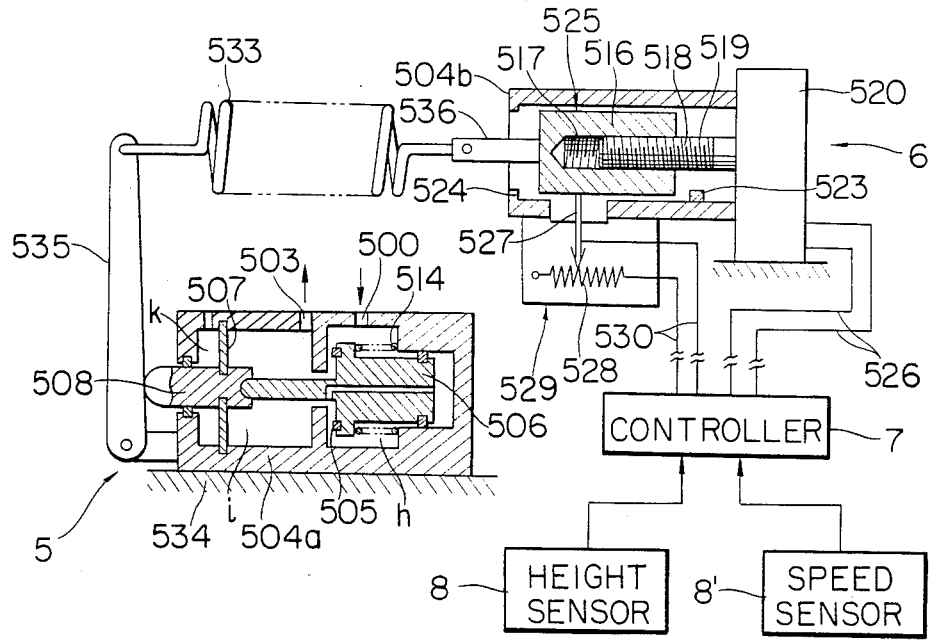
FIG. 34 is a sectional view of a tenth embodiment of the present invention.

A tenth embodiment of the present invention shown in FIG. 34 includes a different form of the variable pressure control valve 5 included in the ninth embodiment, and the same reference numerals are used in FIG. 34 to designate equivalent parts appearing in FIGS. 32 and 33.

This tenth embodiment deals with the case where the variable pressure control valve 5 incorporating the control compression spring 513 therein and constructed integrally with the drive unit 6 in the ninth embodiment cannot be used from the viewpoint of, for example, the layout of the vehicle. This tenth embodiment differs from the ninth embodiment in that a control tension spring 533 is used in lieu of the compression spring 513, and the variable pressure control valve 5 is provided separately from the drive unit 6. The valve body 504 is split into a body portion 504a incorporating the valve piston 506 of the variable pressure control valve 5 therein and a body portion 504b incorporating the slider 516 of the drive unit 6 therein, and these body portions 504a and 504b are carried by a frame 534 mounted on the vehicle body. A lever 535 is pivoted at one end thereof to the body portion 504a, and the free end of the shaft 508 protruding to the exterior of the body portion 504a is engageable with the lever 535. The tension spring 533 is anchored at one end thereof to the other end of the lever 535 and at the other end thereof to one end of a spring retaining rod 536 extending from the slider 516. The remaining structure is the same as that of the ninth embodiment.

The operation of this tenth embodiment is substantially the same as that of the ninth embodiment except that the force of the spring 533 is transmitted through the lever 535 to the shaft 508.

Figure 35:
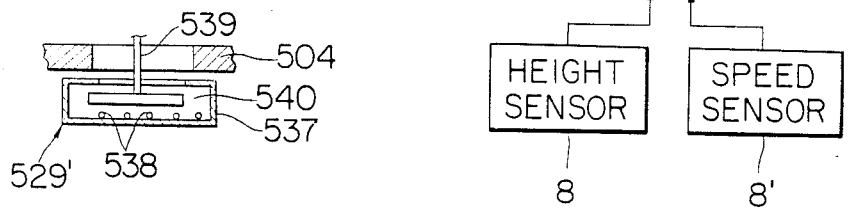
FIG. 35 is a sectional view of a part of an eleventh embodiment of the present invention.

In an eleventh embodiment of the present invention partly shown in FIG. 35, the potentiometer type of displacement sensor 529 employed in the ninth and tenth embodiments is replaced by a photosensor type of displacement sensor 529', and the same reference numerals are used in FIG. 35 to designate equivalent parts appearing in FIGS. 32 to 34.

Referring to FIG. 35, the displacement sensor 529' includes a plurality of light emitters 538 disposed in a casing 537 mounted on the valve body 504 or body portion 504b, an arm 539 mounted on the slider 516, and a light reflection rod 540 fixed to the arm 539. Light emitted from the light emitters 538 is directed toward the light reflection rod 540, and the number of pulses of light reflected from the rod 540 is counted to sense the displacement of the slider 516.

In another embodiment not shown, a revolution counter type of displacement sensor counting the number of revolutions of the step motor 520 proportional to the displacement of the slider 516 may be used in lieu of the sensor directly sensing the displacement of the slider 516.

According to the ninth, tenth and eleventh embodiments of the present invention, therefore, the set force of the control spring incorporated in or associated with the variable pressure control valve 5 can be adjusted during the steps of manufacture of the valve 5, so that the valve 5 can be easily mounted on the vehicle without the necessity for adjustment of the set force of the spring on the assembly line.

Further, in the aforementioned embodiments, the pressure control operation of the variable pressure control valve 5 to meet the sensed vehicle weight is effected under control of the controller 7 in the standstill condition only of the vehicle. Therefore, the air pressure can be accurately controlled to meet the actual weight of the vehicle, and an undesirable response delay resulting from a change of the air pressure can be reliably avoided, thereby minimizing the frequency of repeated air pressure control and improving the durability and reliability of the variable pressure control valve 5.

For example, not only the air pressure is controlled to meet the change of the weight of the vehicle, but also the driver can adjust the air pressure as desired by the function of the controller 7 when a regulator manipulated by the driver is disposed adjacent to the driver's seat in the vehicle to be connected to the controller 7.

Figure 36:
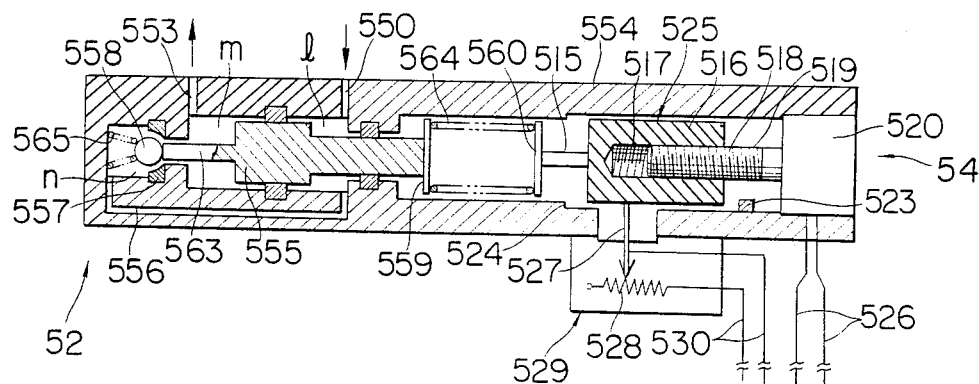
FIG. 36 is a sectional view of a twelfth embodiment of the present invention.

A twelfth embodiment of the present invention shown in FIG. 36 includes modifications of the variable pressure control valve 52 and drive unit 54 included in the second embodiment. Since the structure of the drive unit 54 in this embodiment is the same as that of the drive unit 6 included in the ninth embodiment, the same reference numerals are used in FIG. 36 to designate equivalent parts appearing in FIGS. 32 and 33 to dispense with any detailed description thereof.

Referring to FIG. 36, the modified variable pressure control valve 52 includes a valve body 554 having an inlet port 550 connected to the fixed pressure control valve assembly 50 and an outlet port 553 connected to the rear brakes 53, a plunger 555 slidably disposed in the valve body 554 to operate in response to the internal pressure differential between an inlet pressure chamber l and an outlet pressure chamber m, a ball valve member 558 disposed in a valve chamber n communicating with the inlet pressure chamber l through a passage 556 and communicating also with the outlet pressure chamber m and cooperating with a valve seat 557 to control communication between the two pressure chambers l and m, a control compression spring 564 supported at one end thereof by a rightward extension of the plunger 555 through a spring seat 559 and at the other end thereof by another spring seat 560 and normally maintaining the ball valve member 558 in its open position through the medium of a rod 563 extending from the plunger 555, and a weak spring 565 biasing the ball valve member 558 toward its closed position.

The operation of the twelfth embodiment will now be described.

The ball valve member 558 is normally maintained in its open position by the force of the spring 564 imparted through the extension 563 of the plunger 555. The braking hydraulic fluid at the regulated pressure is supplied from the fixed pressure control valve assembly 50 to the pressure inlet port 550 to flow through the inlet pressure chamber l, passage 556, valve chamber n and outlet pressure chamber m in the above order to be supplied to the rear brakes 53 thereby providing the rear-wheel braking force equal to the front-wheel braking force. At this time, the internal pressure of the outlet pressure chamber m acting upon the left-hand large pressure-receiving area of the plunger 555 imparts a force tending to urge the plunger 555 rightward, while the combination of the internal pressure of the inlet pressure chamber l acting upon the right-hand small pressure-receiving area of the plunger 555 and the force of the control spring 564 imparts a force tending to urge the plunger 555 leftward. Therefore, when the pressure of the braking hydraulic fluid increases until it exceeds a transition point at which a balance is reached between the rightward and leftward urging forces, the rightward urging force overcomes the leftward urging force to cause rightward movement of the plunger 555, and the ball valve member 558 is brought into seating engagement with the valve seat 557 thereby interrupting communication between the two pressure chambers l and n. Then, when the leftward urging force overcomes the rightward urging force as a result of a further increase in the pressure of the hydraulic fluid, the plunger 555 is urged leftward, and the ball valve member 558 is moved away from the valve seat 557 to permit communication between the two pressure chambers l and n. In this manner, after the transition point is reached, the valve member 558 is brought to its open and closed positions by the plunger 555 until the leftward and rightward urging forces balance each other, and the internal pressure of the outlet pressure chamber m is maintained at a level lower than that of the inlet pressure chamber l in a relation corresponding to the ratio between the two pressure-receiving areas of the plunger 555, so that the rate of increase of the rear-wheel braking force is maintained to be lower than that of the front-wheel braking force.

Depending on an increase or a decrease of the weight of the vehicle, the step motor 520 is rotated in the normal or reverse direction in response to the drive signal applied from the controller 7. By the corresponding rotation of the rotary shaft 518, the slider 516 is shifted leftward or rightward to increase or decrease the set force of the spring 564, so that the critical level of the pressure of the hydraulic fluid at the transition point becomes higher or lower.

In the manner above described, the set force of the spring 564 is changed to change the fluid pressure level at the transition point so as to change the distribution of the front-wheel and rear-wheel braking forces.

Figure 37:
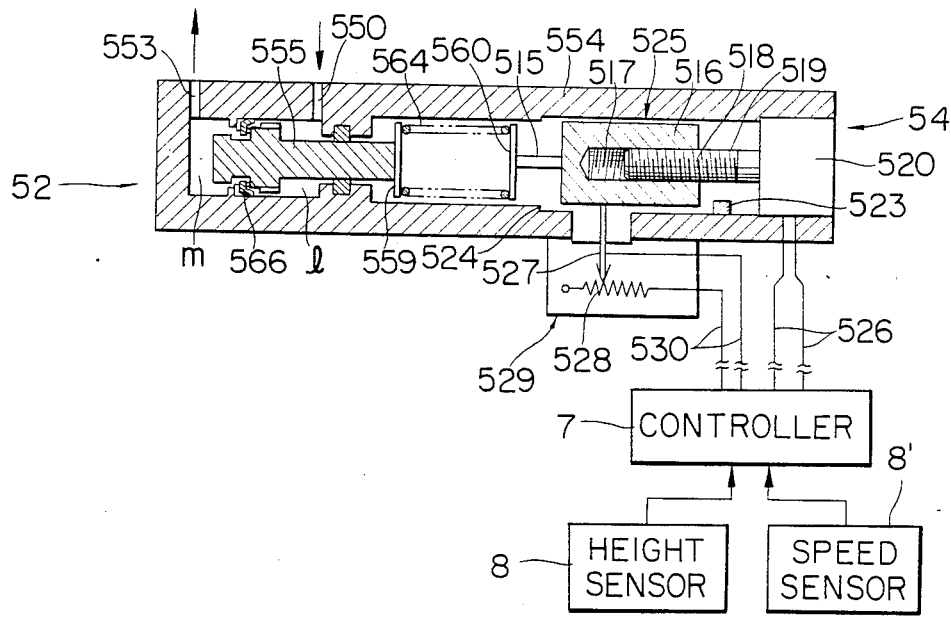
FIG. 37 is a sectional view of a thirteenth embodiment of the present invention.

A thirteenth embodiment of the present invention shown in FIG. 37 includes a modification of the variable pressure control valve 52 included in the twelfth embodiment, and the same reference numerals are used in FIG. 37 to designate equivalent parts appearing in FIG. 36.

The variable pressure control valve 52 in this thirteenth embodiment is so constructed that the plunger 555 cooperates directly with an annular seal 566 mounted on a stepped or shoulder portion of the valve body 554 to control communication between the inlet pressure chamber l and the outlet pressure chamber m. In the thirteenth embodiment, therefore, the passage 556, valve chamber n, ball valve member 558 and spring 565 provided in the twelfth embodiment are unnecessary. The remaining structure is the same as that of the twelfth embodiment.

In the modified variable pressure control valve 52 in the embodiment shown in FIG. 37, the combination of the plunger 555 and the annular seal 566 functions in the same way as the combination of the corresponding parts in the variable pressure control valve 52 described with reference to FIG. 12 to control the pressure of the braking hydraulic fluid in the same mode.

When, in the twelfth and thirteenth embodiments too, the variable pressure control valve 52 incorporating the control compression spring 564 therein and constructed integrally with the drive unit 54 cannot be used from the viewpoint of, for example, the layout of the vehicle as in the tenth embodiment, a control tension spring may be used in lieu of the control compression spring 564, and the variable pressure control valve 52 may be provided separately from the drive unit 54.

Figure 38:
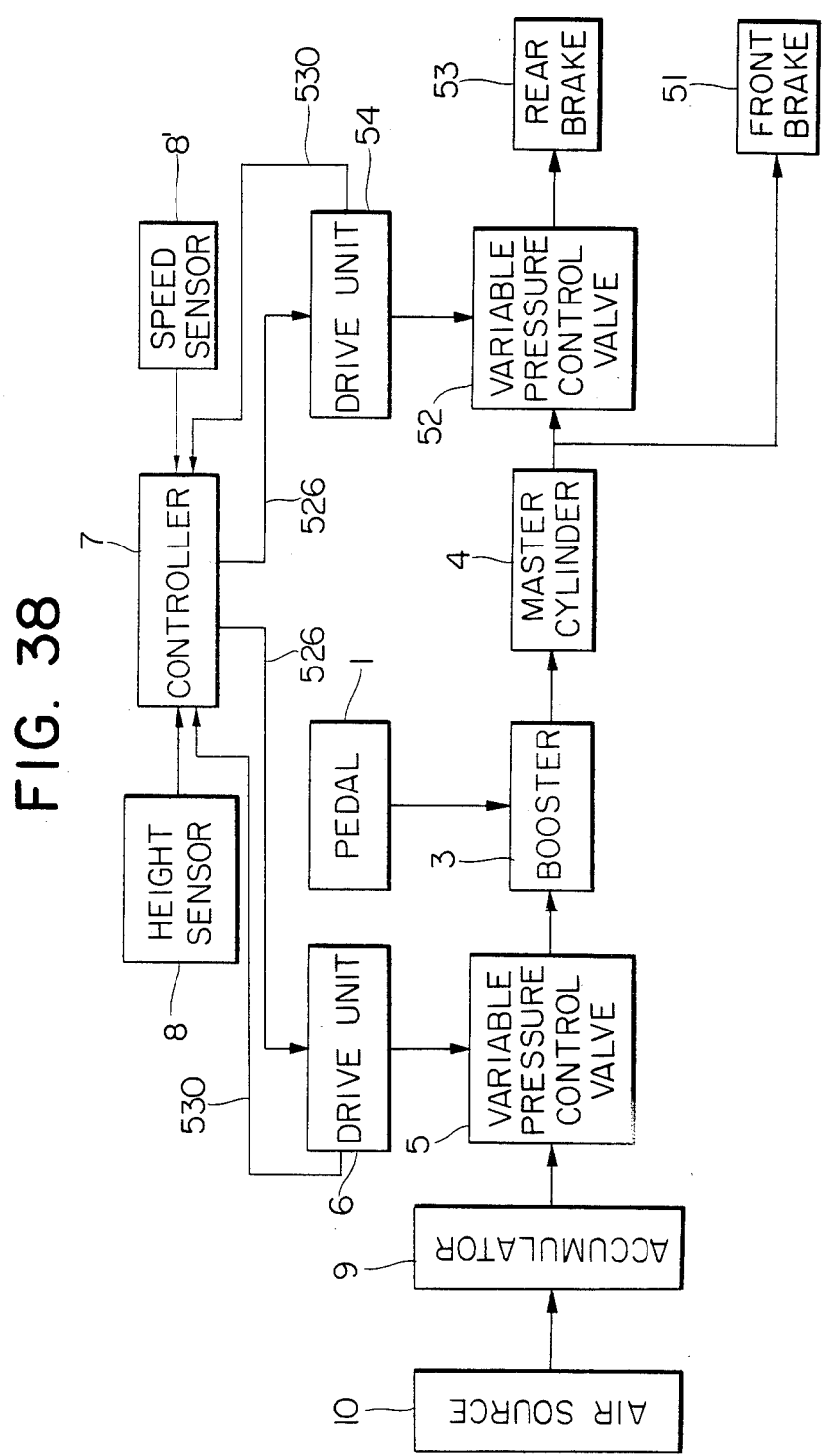
FIG. 38 is a block diagram of a fourteenth embodiment of the present invention.
Figure 39:
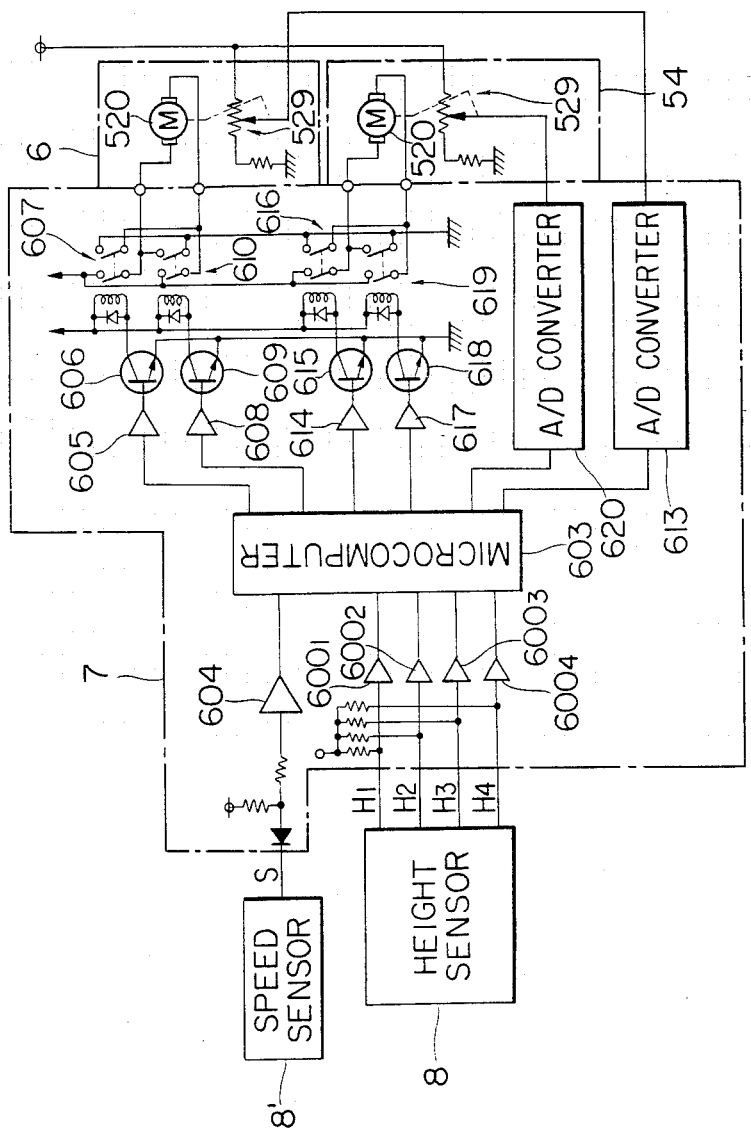
FIG. 39 is a circuit diagram of the fourteenth embodiment shown in FIG. 38.
Figure 40:
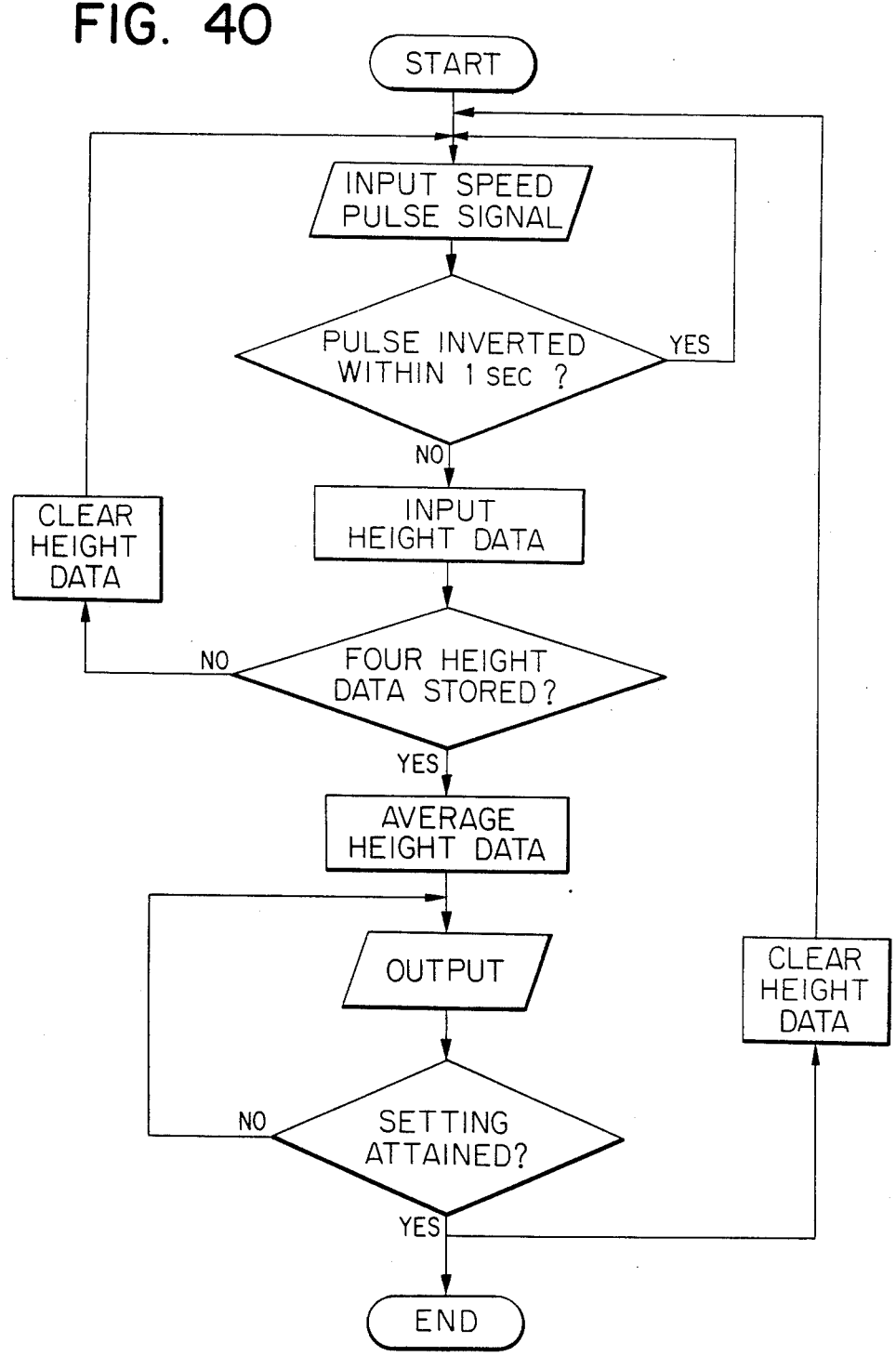
FIG. 40 is a flow chart of operation of the controller in the fourteenth embodiment shown in FIG. 38.

A fourteenth embodiment shown in FIGS. 38 to 40 is provided by combining the ninth and twelfth embodiments with the first embodiment, and the same reference numerals are used in FIGS. 38 to 40 to designate parts common to those in the first, ninth and twelfth embodiments.

Referring to FIGS. 38 to 40, the controller 7 includes a buffer circuit, a microcomputer 603, analog-digital converters 613, 620, relays, etc. The vehicle height sensor (the vehicle weight sensor) 8 is in the form of a 4-bit digital sensor which sequentially generates 4-bit digital vehicle height signals $H_1$, $H_2$, $H_3$ and $H_4$ each indicative of the sensed height of the vehicle. The 4-bit digital height signals $H_1$, $H_2$, $H_3$ and $H_4$ are applied to the microcomputer 603 through the buffer circuit including associated buffer amplifiers $600_1$, $600_2$, $600_3$ and $600_4$. The vehicle speed sensor 8' generates a vehicle speed pulse signal S indicative of the sensed speed of the vehicle to apply this signal S to the microcomputer 603 through a buffer amplifier 604. This vehicle speed sensor 8' may be of the type in which a lead switch is turned on-off in response to a change of magnetic flux produced by a magnet rotating in synchronism with the rotation of the output shaft of the transmission of the vehicle or of the type in which transmission of light between a light emitting element and a light receiving element of a photo coupler is interrupted by an intercepting member rotating in synchronism with the rotation of the transmission output shaft.

A first drive signal generated from the microcomputer 603 is applied through an associated amplifier 605 to a first transistor 606, and the transistor 606 is turned on to energize a first relay 607 thereby causing rotation of the step motor 520 in the drive unit 6 in, for example, the normal direction. A second drive signal generated from the microcomputer 603 is applied through another amplifier 608 to a second transistor 609 which is turned on to energize a second relay 610 thereby causing reverse rotation of the step motor 520 in the drive unit 6. The angular displacement or angular rotation of this step motor 520 is sensed by the associated potentiometer type displacement sensor 529, and the output signal from this sensor 529 is converted into a digital signal by the first analog-digital converter 613 to be fed back to the microcomputer 603. Similarly, a third drive signal generated from the microcomputer 603 is applied through another amplifier 614 to a third transistor 615 which is turned on to energize a third relay 616 thereby causing normal rotation of the step motor 520 in the drive unit 54. Similarly, a fourth drive signal generated from the microcomputer 603 is applied through another amplifier 617 to a fourth transistor 618 which is turned on to energize a fourth relay 619 thereby causing reverse rotation of the step motor 520 in the drive unit 54. The angular displacement or angular rotation of this step motor 520 is sensed by the associated potentiometer type displacement sensor 529, and the output signal from this sensor 529 is converted into a digital signal by the second analog-digital converter 620 to be fed back to the microcomputer 603.

The operation of the microcomputer 603 will be described with reference to a flow chart shown in FIG. 40.

When the program routine to be executed by the microcomputer 603 starts, the vehicle speed pulse signal S is applied from the sensor 8' to the microcomputer 603. The vehicle speed pulse signal S is checked 50 times at intervals of 20 msec by a vehicle status discrimination circuit which detects as to whether or not inversion of the pulses occurs within 1 sec for discriminating whether the vehicle stands still or is running. When the inversion of the pulses is detected, that is, when the vehicle is running, the routine returns to the start. On the other hand, when the inversion of the pulses is not detected, that is, when the vehicle stands still without running, one of the digital vehicle height signals $H_1$, $H_2$, $H_3$ and $H_4$ (referred to hereinafter as vehicle height data) indicative of the vehicle height proportional to the weight or load of the vehicle is applied to a memory circuit. This memory circuit includes, for example, four memories for sequentially storing the vehicle height data at intervals of 1 sec.

When now the pulse inversion occurs due to starting of running of the vehicle from the standstill condition, the application of the vehicle height data to the memory circuit is ceased, and, in synchronizm with the cessation of height data application, the vehicle status discrimination circuit detects whether or not four vehicle height data have been stored in the memory circuit so as to judge whether or not the vehicle has stood still over 4 sec. If the result of detection proves that the number of the vehicle height data stored in the memory circuit is three or less, that is, when the result of judgment proves that the period of standstill of the vehicle is 3 sec or less, all the vehicle height data stored in the memory circuit are cleared, and the routine returns to the start. On the other hand, when the result of detection proves that the number of the vehicle height data stored in the memory circuit is four, that is, when the result of judgment proves that the period of standstill of the vehicle is 4 sec or more, the four vehicle height data are read out from the memory circuit and applied to an arithmetic circuit to be averaged. On the basis of the averaged value of the vehicle height data, a setting circuit selects, from among many previously-set characteristic data, a setting of angular rotation of the step motor 520 proportional to the relative displacement of the rotary shaft 518 and slider 516 in the drive unit 6 and a setting of angular rotation of the step motor 520 proportional to the relative displacement of the rotary shaft 518 and slider 516 in the drive unit 54.

After these settings of angular rotation of the step motors 520 are compared with the data of actual angular rotation of the step motors 520 regulated by the preceding run of the routine, the first or second drive signal for rotating the step motor 520 in the drive unit 6 in the normal or reverse direction appears from the microcomputer 603 together with the third or fourth drive signal for rotating the step motor 520 in the drive unit 54 in the normal or reverse direction. The amounts of actual angular rotation of the step motors 520 driven in response to the drive signals are sensed by the associated potentiometer type displacement sensors 529 respectively, and the output signals from the sensors 529 are fed back to a comparison circuit after being converted into the corresponding digital signals. The signals indicative of the amounts of actual angular rotation of the step motors 520 are continuously compared with the respective settings in the comparison circuit, and the drive signals continue to be generated from the microcomputer 603 until coincidence is reached therebetween. As soon as the coincidence is reached, the drive signals disappear to stop rotation of the step motor 520 in the drive unit 6 and the step motor 520 in the drive unit 54. At the same time, all the vehicle height data stored in the memory circuit are cleared to complete the routine.

Figure 41:
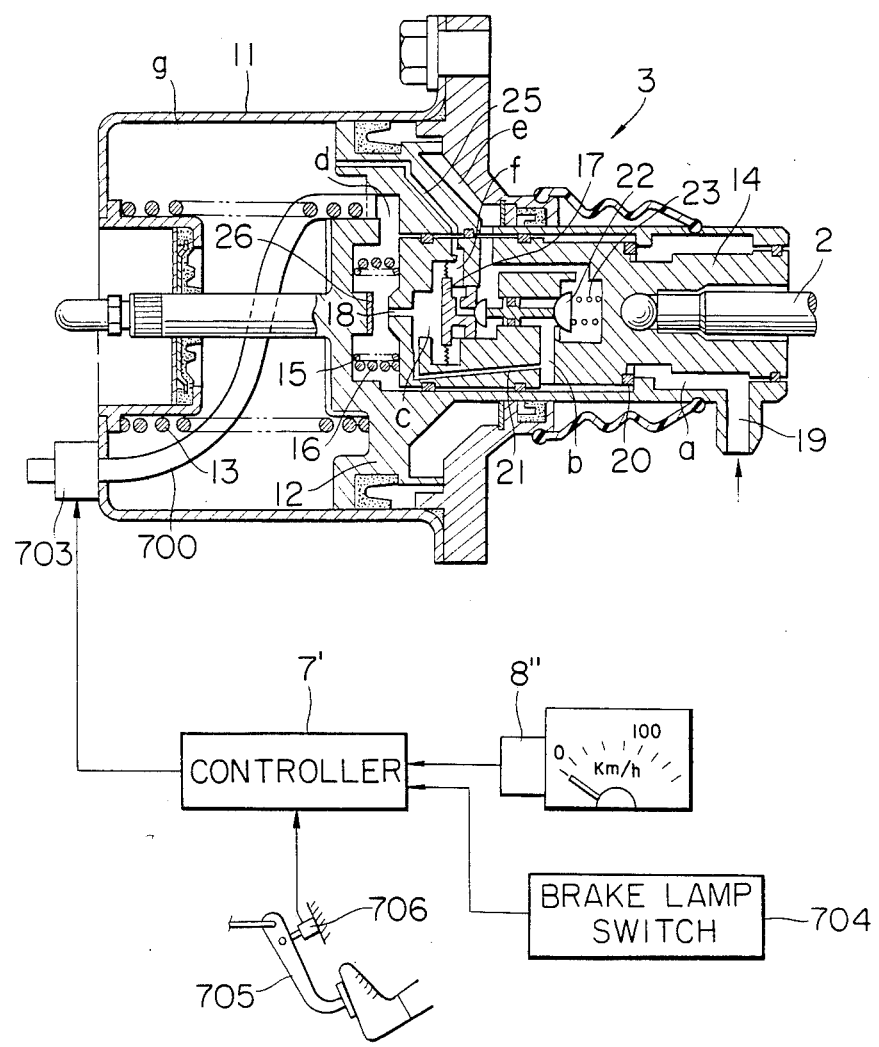
FIG. 41 is a sectional view of the booster unit in a fifteenth embodiment of the present invention.

In a fifteenth embodiment of the present invention shown in FIGS. 41 and 42, an improved equivalent of the booster unit 3 included in the first embodiment is provided so as to reduce the quantity of compressed air consumed as when the brake pedal is incessantly or continuously depressed during a long time of stoppage of the vehicle due to a traffic congestion or running on an ascent or a descent.

In the improved booster unit 3 shown in FIG. 41, the pressure chamber d defined between the power piston 12 and the opposite end of the regulator 14 formed with the nozzle 18 communicates with the atmosphere through a flexible hose 700 acting as an atmosphere communication passage and through a solenoid-operated on-off valve 703 connected to the hose 700 and fixedly mounted on the housing 11. The pressure chamber f communicates with the atmospheric pressure chamber g through a discharge passage 25 formed in the power piston 12.

The solenoid-operated valve 703 is energized and deenergized under control of a controller 7'. A vehicle speed switch 8" combined with a speed meter applies a vehicle speed signal to the controller 7', and a brake lamp switch 704 turned on in response to the depression of the brake pedal 1 applies a brake actuation signal to the controller 7'. On the basis of these input signals, the controller 7' detects the state of brake application in which the vehicle speed is zero and yet the brake pedal 1 is depressed, and generates an output signal for closing the solenoid-operated valve 703. An accelerator actuation signal from an accelerator switch 706 turned on in response to the depression of an accelerator pedal 705 is also applied to the controller 7'. In the starting stage of the vehicle, the above output signal from the controller 7' disappears in response to the application of the accelerator actuation signal thereto, thereby opening the solenoid-operated valve 703.

FIG. 42 shows the structure of the controller 7' in detail.

In the starting stage and during running of the vehicle, the vehicle speed switch 8" is in its on state to discharge a capacitor 710, while, when the vehicle speed is zero, that is, when the vehicle stands still without moving, the vehicle speed switch 8" is turned off to charge the capacitor 710. An output signal appears from a Schmidt circuit 713 connected to the capacitor 710 during the period of time in which an input voltage higher than a predetermined high level is applied thereto due to the charging of the capacitor 710, and such an output signal does not appear during the period of time in which the input voltage is lower than a predetermined low level due to the discharging of the capacitor 710. The Schmidt circuit 713 is connected at its output terminal to a monostable multivibrator 714 directly and to another monostable multivibrator 715 through an inverter 716. Therefore, a positive one-shot pulse having a constant duration is generated from the monostable multivibrator 714 when the output signal from the Schmidt circuit 713 is applied thereto in the standstill state of the vehicle. On the other hand, a similar positive one-shot pulse having a constant duration is generated from the other monostable multivibrator 715 as soon as the output signal from the Schmidt circuit 713 disappears in the starting stage of the vehicle and an input signal of high level is applied thereto from the inverter 716. The two multivibrators 714 and 715 are connected in common at their Q output terminals to an OR circuit 717 which generates its output signal of high level in response to the application of the input signal of high level from either of the multivibrators 714, 715 to turn on a transistor 718 thereby discharging a capacitor 719. Another Schmidt circuit 720 connected to the capacitor 719 ceases to generate its output signal when an input voltage lower than a predetermined low level is applied thereto due to the discharging of the capacitor 719 in the standstill state or starting stage of the vehicle. On the other hand, the Schmidt circuit 720 generates its output signal as soon as an input voltage higher than a predetermined high level is applied thereto due to subsequent charging of the capacitor 719. A negative one-shot pulse having a constant duration is generated from a monostable multivibrator 723 connected to the Schmidt circuit 720 as soon as the output signal from the Schmidt circuit 720 disappears.

The brake lamp switch 704 is connected to a brake lamp 724 to be turned on to energize the lamp 724 as far as the brake pedal 1 is continuously depressed for applying the brake. A capacitor 725 discharges normally while the brake lamp switch 704 is in its off position, and this capacitor 725 is charged in response to the turn-on of the switch 704. Another Schmidt circuit 726 connected to the capacitor 725 generates its output signal when an input voltage higher than a predetermined high level is applied thereto due to the charging of the capacitor 725 during application of the brakes. On the other hand, the Schmidt circuit 726 ceases to generate its output signal as soon as an input voltage lower than a predetermined low level is applied thereto due to the discharging of the capacitor 725 in response to the release of the brakes. Therefore, an output signal of low level appears from an inverter 727 connected to the Schmidt circuit 726 when the brakes are applied, and an output signal of high level appears therefrom when the brakes are released.

The monostable multivibrator 723 and the inverter 727 are connected to a NOR circuit 728 which generates an output signal of high level when the outputs from the multivibrator 723 and inverter 727 are both of low level. A flip-flop 729 connected to the NOR circuit 728 generates an output signal of high level in response to the application of an input signal of high level to its set input terminal S from the NOR circuit 728, to turn on transistors 730 and 733 thereby energizing to close the solenoid-operated valve 703.

The accelerator switch 706 is kept turned off as far as the accelerator pedal 705 is continuously depressed in the starting stage and during running of the vehicle and is turned on as soon as the accelerator pedal 705 is released. A capacitor 734 is charged while the accelerator switch 706 is in its off state, and the capacitor 734 starts to discharge in response to the turn-on of the switch 706. Another Schmidt circuit 735 connected to the capacitor 734 generates its output signal when an input voltage higher than a predetermined high level is applied thereto due to the charging of the capacitor 734. On the other hand, the Schmidt circuit 735 ceases to generate its output signal as soon as an input voltage lower than a predetermined low level is applied thereto due to the discharging of the capacitor 734. The Schmidt circuit 735 is connected at its output terminal to the reset input terminal R of the flip-flop 729. Therefore, as soon as the Schmidt circuit 735 generates its output signal in response to the depression of the accelerator pedal 705 for starting the vehicle, the flip-flop 729 is reset, and its output signal of high level disappears. As a result, the solenoid-operated valve 703 is deenergized to open.

In the operation of the booster unit 3 above described, no output signal is generated from the controller 7' and the solenoid-operated valve 703 is deenergized to be placed in its open position when the depression force is imparted to the brake pedal 1 while the vehicle is running. The booster unit 3 operates in a mode as described with reference to FIG. 3, and the master cylinder 4 is actuated to brake the vehicle under control of the controller 7'. In this case, air passed through the nozzle 18 is discharged from the pressure chamber d to the atmosphere through the hose 700 and solenoid-operated valve 703.

When the vehicle is brought to a halt by impartation of the depression force to the brake pedal 1, the controller 7' generates its output signal closing the solenoid-operated valve 703. As a result, compressed air of maximum pressure introduced into the pilot pressure chamber c through the inlet port 19 is reserved in the pilot pressure chamber c without being discharged, and the diaphragm 17 and valve member 22 are urged rightward to permit communication between the pressure chambers e and b. At the time at which the maximum air pressure builds up in the pressure chamber e, the valve member 22 is urged to its closed position thereby interrupting communication between the pressure chambers b and e. Therefore, the power piston 12 is urged leftward toward its maximum-power developing position so that the master cylinder 4 is actuated by the maximum output that can be developed by the booster unit 3. In this case, the predetermined air pressure is maintained in the pilot pressure chamber c even when the brake pedal 1 may not be continuously depressed or the brake pedal depression force may be discontinuously released, so that the booster unit 3 and the master cylinder 4 are maintained in the braking mode.

When the accelerator pedal 705 is depressed under the above state for re-starting the vehicle, the output signal from the controller 7' disappears to open the solenoid-operated valve 703, and compressed air in the pilot pressure chamber c is discharged to the atmosphere by flowing through the nozzle 18, hose 700 and solenoid-operated valve 703 in the above order. Due to the drop of the internal pressure of the pilot pressure chamber c, the diaphragm 17 moves away from the valve member 22, and compressed air in the pressure chamber e flows through the pressure chamber f and discharge passage 25 to be discharged to the atmosphere from the atmospheric pressure chamber g. The power piston 12 is returned to the illustrated brake releasing position, and the master cylinder 4 is released from its braking operation.

Thus, according to the improved booster unit 3 shown in FIG. 41, the solenoid-operated valve 703 is closed to prevent discharge of compressed air from the booster unit 3 even when the brake pedal 1 is incessantly or continuously depressed during a long time of stoppage of the vehicle due to, for example, a traffic congestion or running on an ascent or a descent. Therefore, the compressed air consumption of the booster unit 3 is greatly reduced compared with that of the booster unit 3 included in the first embodiment. Consequently, an accumulator and a compressor of small capacity and small size facilitating installation in the vehicle can be used, and the compressor need not be continuously operated thereby improving the durability thereof.

Further, once the brake pedal 1 is depressed to place the booster unit 3 in operation in the standstill state of the vehicle, the vehicle braking condition is maintained even when the brake pedal depression force is then released. Therefore, even when the depression force imparted to the brake pedal of a vehicle equipped with an automatic transmission may be released while the vehicle stands still on, for example, an ascent or a descent, the vehicle would not start to coast in response to the release of the brake pedal depression force, so that the present invention exhibits a very great effect from the viewpoints of alleviation of the driver's fatigue and facilitation of vehicle starting on an incline.

In the embodiment described with reference to FIGS. 41 and 42, compressed air at maximum pressure supplied to the inlet port 19 will be confined in the pressure chamber e and pilot pressure chamber c of the booster unit 3 regardless of the magnitude of the brake pedal depression force when the vehicle being braked is brought to a halt, and the driver may experience a feeling of physical disorder.

In an effort to eliminate such a feeling of physical disorder, another solenoid-operated valve 740 opened and closed under control of the controller 7' is disposed at the inlet port 19 of the booster unit 3 in a modification shown in FIG. 43. This solenoid-operated valve 740 is so controlled by the controller 7' that it is closed slightly earlier than or simultaneously with the solenoid-operated valve 703. When the solenoid-operated valve 740 is closed, compressed air at the pressure proportional to the brake pedal depression force is confined in the pilot pressure chamber c and pressure chamber e of the booster unit 3. Therefore, the vehicle can be maintained in the standstill state by the braking force proportional to the brake pedal depression force, and the feeling of physical disorder can be eliminated.

As another means for eliminating the feeling of physical disorder, a solenoid-operated valve may be disposed in the braking hydraulic fluid line connecting the master cylinder 4 to the brakes of the vehicle so as to be closed under control of the controller 7'.

When the vehicle runs on a road such as a snowladen road having a low coefficient of friction, and the brakes are applied to stop the vehicle, some of the wheels of the vehicle may be locked, and the vehicle speed may be apparently reduced to zero. In such a case, the booster unit may mal-operate, and compressed air at maximum pressure may be confined in the booster unit, resulting in the dangerous tendency of locking of the remaining wheels. In another modification of the present invention which prevents such mal-operation of the booster unit 3, a circuit reading or computing the rate of change of the vehicle speed is provided in the controller 7' to prevent early closure of the solenoid-operated valve 703 so that compressed air at the maximum pressure may not be confined in the booster unit 3 in the event where an abrupt rate of change occurs in the speed of the vehicle. Further, an acceleration sensor may be mounted on the vehicle body to apply its output signal to the controller 7', and the controller 7' may include an additional circuit for judging whether the speed of the vehicle is truly reduced to zero or is merely being decreased when locking of the wheels is detected, so that objectionable mal-operation of the booster unit 3 can be more reliably prevented.

What is claimed is:

1. A brake system for a vehicle comprising:
   booster means including a housing, a power piston disposed slidably in said housing for defining within said housing a first chamber communicating with atmosphere and a second chamber, a regulator disposed slidably in said power piston, flow shut-off means communicating with a gas pressure source and opened and closed by movement of said regulator relative to said power piston, flow restriction means provided between said first chamber and said gas pressure source for restricting flow of gas in response to movement of said regulator, a pilot pressure chamber disposed upstream of said flow restriction means, movable means moved by the internal pressure of said pilot pressure chamber thereby permitting communication between said second chamber and said gas pressure source, and a reaction spring disposed between said power piston and said regulator;
   a master cylinder connected to said power piston of said booster means to supply braking hydraulic fluid at controlled pressure to front and rear brakes; and
   a brake pedal actuating said regulator;
   said gas pressure source being a unit supplying air under pressure, said pilot pressure chamber being defined in said regulator for communication with said flow shut-off means, said flow restriction means including a nozzle formed in said regulator for communication with said pilot pressure chamber and a surface formed on said power piston opposite to said nozzle in said first chamber so that the distance between it and said nozzle is variable with the movement of said regulator relative to said power piston, said movable means including first valve means including a diaphragm member forming a wall of said pilot pressure chamber so as to be movable in response to the internal pressure of said pilot pressure chamber and defining a discharge passage permitting communication between said first chamber and said second chamber, and second valve means arranged for normally interrupting communication between said flow shut-off means and said second chamber but being opened in response to the movement of said diaphragm member due to build-up of the internal pressure of said pilot pressure chamber.

2. A brake system as claimed in claim 1, wherein said nozzle extends in parallel with the axis of sliding movement of said power piston, said surface of said power piston being disposed in orthogonal relation to said nozzle, said diaphragm member extending in parallel with said surface of said power piston, and wherein an actuating rod extends from said surface of said power piston toward said diaphragm member through said nozzle so as to urge said diaphragm member in the valve opening direction of said second valve means in response to abrupt actuating movement of said regulator.

3. A brake system as claimed in claim 1, further comprising valve means disposed downstream of said flow restriction means, and a controller controlling said valve means so that said valve means is closed in response to the depression of the brake pedal when the speed of the vehicle is zero, and said valve means is opened in response to the depression of the accelerator pedal.

4. A brake system as claimed in claim 1, further comprising pressure control valve means disposed between said gas pressure source and said booster means for setting the maximum value of the pressure of the gas supplied from said gas pressure source to said second chamber and said pilot pressure chamber of said booster means, and a controller controlling said pressure control valve means so that said pressure control valve means generates a gas pressure corresponding to the weight of the vehicle.

5. A brake system as claimed in claim 1, further comprising pressure control valve means disposed between said master cylinder and said front and rear brakes for controlling the pressure of the braking hydraulic fluid supplied to said front and rear brakes, and a controller controlling said pressure control valve means so that said pressure control valve means generates a hydraulic fluid pressure corresponding to the weight of the vehicle.

6. A brake system for a vehicle comprising:
   booster means including a housing, a power piston disposed slidably in said housing for defining a first chamber and a second chamber in said housing, a regulator disposed slidably in said power piston, flow shut-off means communicating with a gas pressure source and opened and closed by movement of said regulator relative to said power piston, flow restriction means provided between said first chamber and said gas pressure source for restricting flow of gas in response to movement of said regulator, a pilot pressure chamber disposed upstream of said flow restriction means, movable means moved by the internal pressure of said pilot pressure chamber thereby permitting communication between said second chamber and said gas pressure source, and a reaction spring disposed between said power piston and said regulator;
   a master cylinder connected to said power piston of said booster means to supply braking hydraulic fluid at controlled pressure to front and rear brakes; and
   a brake-pedal actuating said regulator;
   said movable means including a piston member disposed in said power piston for sliding movement in coaxial relation with said regulator to define said pilot pressure chamber between it and said power piston, and a valve member permitting communication between said second chamber and said gas pressure source with the movement of said piston member relative to said power piston, said flow restriction means including an orifice formed in said piston member and a needle provided on said regulator.

7. A brake system as claimed in claim 6, wherein said first chamber communicates with a source of negative pressure, and atmospheric air is used as said gas pressure source.

8. A brake system as claimed in claim 6, further comprising pressure control valve means disposed between said gas pressure source and said booster means for setting the maximum value of the pressure of the gas supplied from said gas pressure source to said second chamber and said pilot pressure chamber of said booster means, and a controller controlling said pressure control valve means so that said pressure control valve means generates a gas pressure corresponding to the weight of the vehicle.

9. A brake system as claimed in claim 6, further comprising pressure control valve means disposed between said master cylinder and said front and rear brakes for controlling the pressure of the braking hydraulic fluid supplied to said front and rear brakes, and a controller controlling said pressure control valve means so that said pressure control valve means generates a hydraulic fluid pressure corresponding to the weight of the vehicle.

* * * * *